(12) United States Patent
Kiya et al.

(10) Patent No.: US 8,051,934 B2
(45) Date of Patent: Nov. 8, 2011

(54) STRUCTURE MOUNTING AN ELECTRICITY STORAGE PACK ON A VEHICLE

(75) Inventors: Nobuaki Kiya, Toyota (JP); Bunji Nomura, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 427 days.

(21) Appl. No.: 12/280,627

(22) PCT Filed: Feb. 23, 2007

(86) PCT No.: PCT/JP2007/053990
§ 371 (c)(1),
(2), (4) Date: Aug. 25, 2008

(87) PCT Pub. No.: WO2007/100072
PCT Pub. Date: Sep. 7, 2007

(65) Prior Publication Data
US 2009/0166116 A1    Jul. 2, 2009

(30) Foreign Application Priority Data

Feb. 27, 2006 (JP) ................................ 2006-050695
Feb. 1, 2007 (JP) ................................ 2007-023587

(51) Int. Cl.
*B60R 16/04* (2006.01)
(52) U.S. Cl. ...................................... 180/68.5; 180/274
(58) Field of Classification Search ................ 180/68.5, 180/65.1, 65.21, 274; 903/907, 908; 29/412; 296/187.03, 187.05, 187.08, 187.11
See application file for complete search history.

(56) References Cited

U.S. PATENT DOCUMENTS

| | | | | |
|---|---|---|---|---|
| 1,607,908 A | * | 11/1926 | Nelson | 429/99 |
| 1,911,401 A | | 5/1933 | Scott | |
| 1,994,451 A | * | 3/1935 | Christenson | 180/68.5 |
| 2,607,433 A | * | 8/1952 | Simi | 180/68.5 |
| 3,199,624 A | * | 8/1965 | Burns et al. | 180/68.5 |
| 4,129,194 A | * | 12/1978 | Hammond et al. | 180/68.5 |
| 4,169,191 A | * | 9/1979 | Alt et al. | 429/99 |
| 4,252,206 A | * | 2/1981 | Burkholder et al. | 180/68.5 |
| 4,327,809 A | | 5/1982 | Fenstermaker | |
| 4,621,822 A | | 11/1986 | Knöchelmann et al. | |
| 4,682,751 A | * | 7/1987 | Tamas | 248/503 |
| 4,779,692 A | * | 10/1988 | Hagarty et al. | 180/68.5 |
| 4,906,020 A | * | 3/1990 | Haberer | 280/749 |
| 5,476,151 A | | 12/1995 | Tsuchida et al. | |
| 5,521,792 A | * | 5/1996 | Pleitz et al. | 361/715 |
| 5,544,714 A | * | 8/1996 | May et al. | 180/68.4 |
| 5,555,950 A | * | 9/1996 | Harada et al. | 180/65.1 |
| 5,559,420 A | * | 9/1996 | Kohchi | 180/68.5 |
| 5,681,057 A | * | 10/1997 | Whirley et al. | 280/784 |
| 5,706,910 A | * | 1/1998 | Kobayashi | 180/279 |
| 5,947,223 A | | 9/1999 | Rebmann | |

(Continued)

FOREIGN PATENT DOCUMENTS

JP        02-048248 A        2/1990

(Continued)

*Primary Examiner* — Jeffrey J Restifo
*Assistant Examiner* — Brodie Follman
(74) *Attorney, Agent, or Firm* — Sughrue Mion, PLLC

(57) ABSTRACT

There are included a side member formed to support a battery pack, and a rear bracket securing the battery pack to the side member. The rear bracket has one side pivotably coupled to the battery pack, and the other side pivotably coupled to the side member.

9 Claims, 17 Drawing Sheets

U.S. PATENT DOCUMENTS

| | | | |
|---|---|---|---|
| 6,260,609 B1* | 7/2001 | Takahashi | 165/69 |
| 6,386,611 B1* | 5/2002 | Buchfink et al. | 296/37.1 |
| 6,412,581 B2* | 7/2002 | Enomoto et al. | 180/68.4 |
| 6,431,300 B1 | 8/2002 | Iwase | |
| 6,478,106 B2 | 11/2002 | Hawener et al. | |
| 6,547,020 B2* | 4/2003 | Maus et al. | 180/68.5 |
| 6,598,691 B2 | 7/2003 | Mita et al. | |
| 6,648,090 B2 | 11/2003 | Iwase | |
| 6,662,891 B2 | 12/2003 | Misu et al. | |
| 6,827,168 B2 | 12/2004 | Miyazaki | |
| 7,066,515 B2* | 6/2006 | Pierce et al. | 296/21 |
| 7,070,015 B2 | 7/2006 | Mathews et al. | |
| 7,124,851 B2* | 10/2006 | Smith et al. | 180/274 |
| 7,144,039 B2 | 12/2006 | Kawasaki et al. | |
| 7,232,002 B2* | 6/2007 | Taya et al. | 180/274 |
| 7,380,829 B2* | 6/2008 | Kishima | 280/781 |
| 7,380,830 B2* | 6/2008 | Mitsui et al. | 280/784 |
| 7,503,585 B2 | 3/2009 | Hashimura et al. | |
| 7,513,329 B2 | 4/2009 | Nakashima et al. | |
| 7,533,748 B2* | 5/2009 | Miyajima et al. | 180/68.5 |
| 7,610,978 B2* | 11/2009 | Takasaki et al. | 180/68.5 |
| 7,654,351 B2 | 2/2010 | Koike et al. | |
| 7,717,207 B2* | 5/2010 | Watanabe et al. | 180/68.5 |
| 7,749,644 B2* | 7/2010 | Nishino | 429/100 |
| 7,921,951 B2* | 4/2011 | Watanabe et al. | 180/68.5 |
| 2003/0070858 A1 | 4/2003 | Kondo | |
| 2003/0089540 A1 | 5/2003 | Koike et al. | |
| 2004/0090085 A1* | 5/2004 | Kawasaki et al. | 296/187.09 |
| 2004/0124034 A1* | 7/2004 | Komatsu et al. | 180/312 |
| 2004/0159478 A1* | 8/2004 | Masuda | 180/65.2 |
| 2005/0012317 A1* | 1/2005 | Taya et al. | 280/784 |
| 2005/0275181 A1* | 12/2005 | MacIsaac | 280/124.103 |
| 2006/0016633 A1 | 1/2006 | Fujii et al. | |
| 2006/0207815 A1* | 9/2006 | Vandekerkhof | 180/68.4 |
| 2006/0225932 A1* | 10/2006 | Fobean | 180/68.5 |
| 2007/0215399 A1 | 9/2007 | Watanabe et al. | |
| 2008/0078597 A1* | 4/2008 | Voigt et al. | 180/68.5 |
| 2008/0196957 A1 | 8/2008 | Koike et al. | |
| 2008/0283317 A1* | 11/2008 | Wagner et al. | 180/68.5 |
| 2008/0283318 A1* | 11/2008 | Wagner et al. | 180/68.5 |
| 2008/0305388 A1* | 12/2008 | Haussman | 429/120 |
| 2009/0014224 A1* | 1/2009 | Rydberg et al. | 180/68.5 |
| 2009/0026802 A1 | 1/2009 | Imada et al. | |
| 2009/0078487 A1* | 3/2009 | Borg et al. | 180/274 |
| 2009/0090575 A1 | 4/2009 | Nagasaka | |
| 2009/0145676 A1* | 6/2009 | Takasaki et al. | 180/65.1 |
| 2009/0226806 A1* | 9/2009 | Kiya | 429/186 |
| 2009/0242298 A1* | 10/2009 | Guss et al. | 180/68.5 |
| 2009/0294626 A1* | 12/2009 | Abe et al. | 248/675 |
| 2010/0101885 A1 | 4/2010 | Nozaki et al. | |
| 2010/0187027 A1* | 7/2010 | Komaki | 180/65.21 |

FOREIGN PATENT DOCUMENTS

| | | |
|---|---|---|
| JP | 5-201356 A | 8/1993 |
| JP | 06-270697 A | 9/1994 |
| JP | 07-081431 A | 3/1995 |
| JP | 07-117489 A | 5/1995 |
| JP | 2000-168628 A | 6/2000 |
| JP | 2001-113959 A | 4/2001 |
| JP | 2002-046538 A | 2/2002 |
| JP | 2003-118395 A | 4/2003 |
| JP | 2003-327155 A | 11/2003 |
| JP | 2004-243847 A | 9/2004 |
| JP | 2005132348 A | 5/2005 |
| JP | 2005-247063 A | 9/2005 |
| JP | 2006-035915 A | 2/2006 |
| JP | 2007-015600 A | 1/2007 |
| WO | 2005/084985 A1 | 9/2005 |

* cited by examiner

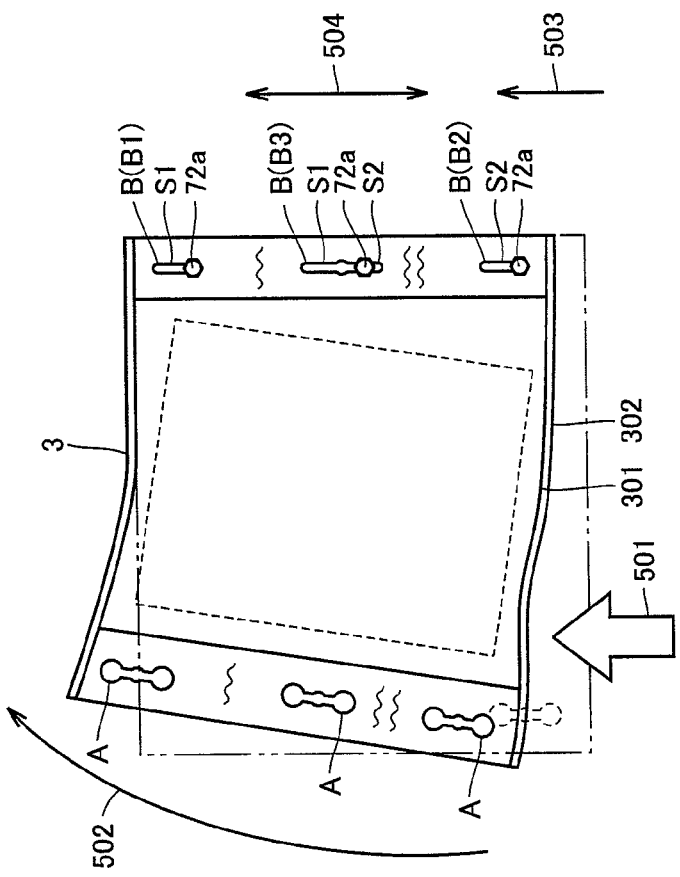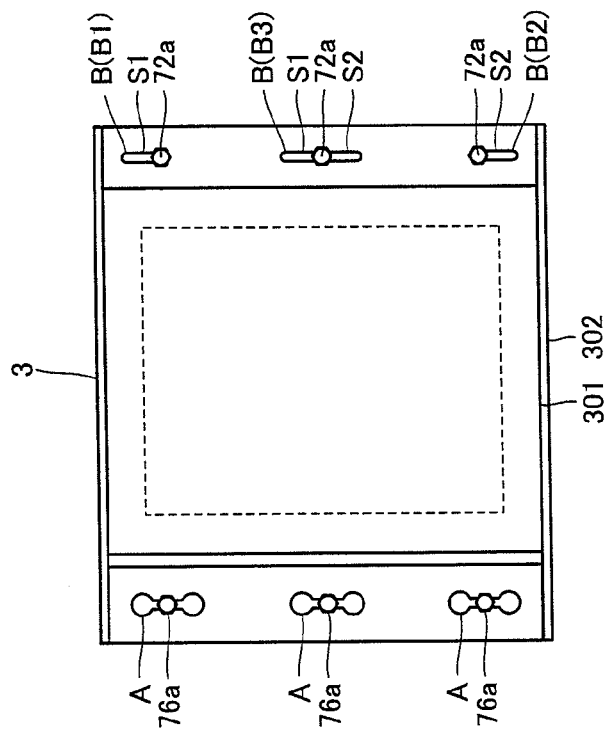

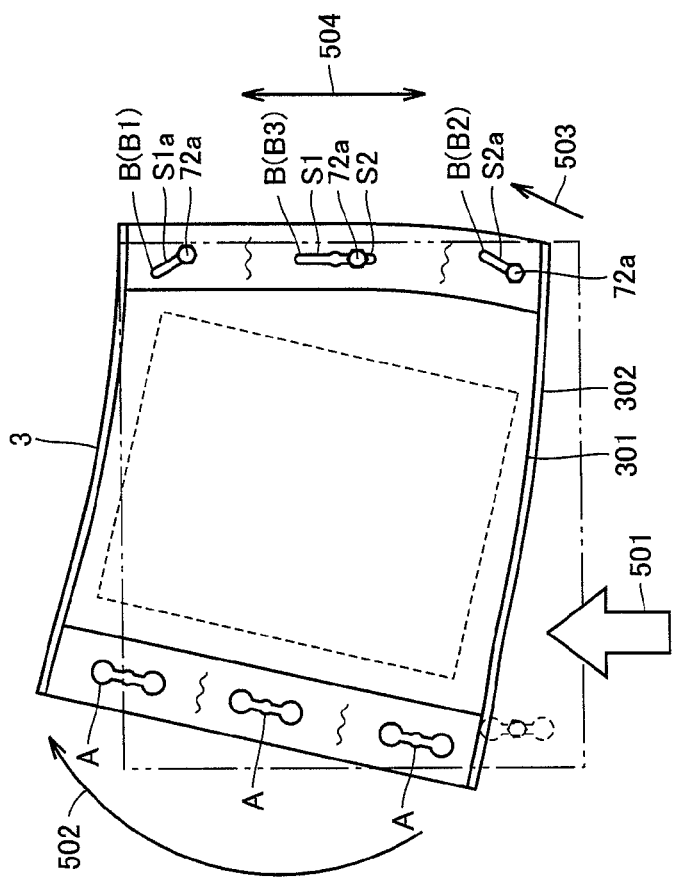
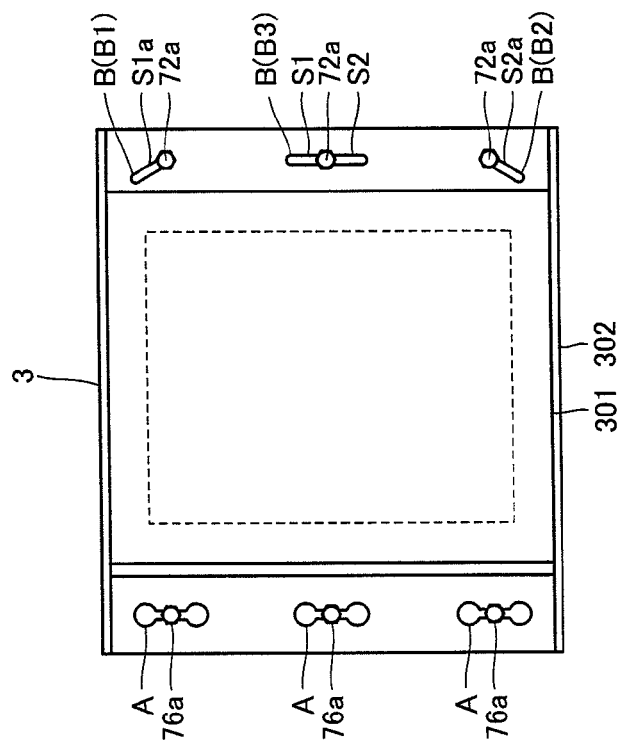
FIG.14A
FIG.14B

STRUCTURE MOUNTING AN ELECTRICITY STORAGE PACK ON A VEHICLE

TECHNICAL FIELD

The present invention relates to structures mounting an electricity storage pack on a vehicle.

BACKGROUND ART

In recent years an electric vehicle employing a motor as a driving source and a so called hybrid electric vehicle having a motor serving as a driving source and another driving source combined together are commercially available. Such vehicles have electricity storage equipment mounted therein for supplying the motor with electricity serving as energy. The electricity storage equipment is implemented for example as a secondary battery represented by a repeatedly rechargeable and dischargeable nickel cadmium battery, nickel hydrogen battery, lithium ion battery and the like, a capacitor and the like. The electricity storage equipment is accommodated in a case and thus mounted as an electricity storage pack on a vehicular body.

Japanese Patent Laying-Open No. 2001-113959 proposes a vehicular battery mounting structure including a battery trestle bearing a battery box disposed in a vehicle at a rear portion on a floor for accommodating a battery, that is formed of a battery mounting portion supporting the battery box, a front leg and a rear leg, with the front leg and the rear leg formed to be fragile for the battery trestle. The publication discloses that when the vehicle is bumped at a rear portion and a load thus acts thereon, the vehicular battery mounting structure can have the fragile front and rear legs deformed to prevent the battery trestle from increasing the floor's rigidity and thus ensure the floor's crush stroke, and also prevent the battery mounting portion from deforming and thus protect the battery box, a battery and the like from damage.

Japanese Patent Laying-Open No. 2005-247063 proposes an electricity storage mechanism attaching structure attached to a side member positioned in a vehicle at a side. The side member has a kick up portion curved upward. A cross member is provided at a front portion of the kick up portion to couple a pair of side members together at their respective side surfaces. A battery pack has a front portion secured to a top surface of the cross member by a front bracket welded to the front portion of the battery pack. The battery pack has a rear portion secured to a top surface of the side member at a rear portion of the kick up portion by a bridge provided to couple the pair of side members. The publication discloses that the electricity storage mechanism attaching structure can reduce or prevent damage to the electricity storage mechanism when the vehicle is bumped at the back.

Japanese Patent Laying-Open No. 6-270697 proposes an auxiliary component arrangement structure for an electric vehicle. In an engine room over a motor, there are a plurality of auxiliary components such as an inverter, an auxiliary battery, an inverter for an air conditioner and the like arranged in the vehicle's body from front to back in order. These auxiliary components are each coupled to an adjacent auxiliary component with a link. The link has opposite ends having coupling points to have positions, respectively, straddling the vehicle's longitudinal axis vertically opposite to each other. The publication discloses that when the vehicle is bumped at the front and thus experiences a load compressively deforming its front body, the auxiliary component arrangement structure allows an auxiliary component posed between two other auxiliary components to move in a direction further diverting from the vehicle's longitudinal axis as the link acts, which can reduce an amount of collision load transmitted rearward from the vehicle's front portion through the auxiliary components, and hence collision load exerted from the vehicle's front portion and reaching the vehicle's cabin.

Japanese Patent Laying-Open No. 2004-243847 proposes a battery support device. More specifically, when a physical impact is exerted from above a battery, the device disengages the battery and a side member fastened (or secured) together and rotationally displaces the battery downward to ensure deformability for the vehicular body when it receives physical impact (or ensure a space between a hood and the battery by rotationally displacing the battery).

An electricity storage pack is secured to a floor panel, a side member or a similar support member supporting the electricity storage pack. For example when vehicles collide with each other and the electricity storage pack directly receives physical impact, the electricity storage pack may receive physical impactive force and be damaged, or sudden braking or the like may cause a load on the vehicle to impinge on the electricity storage pack and thus exert physical impactive force to the electricity storage pack.

Furthermore even if the electricity storage pack does not receive physical impact directly, being bumped by a vehicle from behind or the like may deform the support member, and as the supporting member is deformed, the electricity storage pack per se may receive a load. Furthermore, as the supporting member is deformed, the electricity storage pack may come off the support member, smash another portion and thus experience physical impactive force.

In particular, if the electricity storage pack has damaged a case accommodating a storage battery or similar electricity storage equipment and the internal electricity storage equipment is exposed, the electricity storage equipment may receive physical impact or the like further directly and may not be protected appropriately.

DISCLOSURE OF THE INVENTION

The present invention contemplates a structure mounting an electricity storage pack on a vehicle, that can reduce or prevent damage to the electricity storage pack when the vehicular body or the electricity storage pack receives physical impact.

The present invention in one aspect provides a structure mounting an electricity storage pack on a vehicle, that includes a support member formed to support the electricity storage pack, and a securing member securing the electricity storage pack to the support member. The securing member has one side pivotably coupled to the electricity storage pack and the other side pivotably coupled to the support member.

In the present invention preferably the electricity storage pack is disposed in a vehicular body at one of a rear portion and a front portion.

In the present invention preferably the securing member is formed to have a longitudinal direction. The securing member has the longitudinal direction substantially parallel to a widthwise direction of a vehicular body.

In the present invention preferably the electricity storage pack has one of a front end and a rear end supported by the support member via the securing member. The electricity storage pack has the other end secured to the support member with a screw. The electricity storage pack has a screw hole formed to receive the screw. The electricity storage pack has a thin portion surrounding the screw hole. The thin portion is formed to be thinner than a portion surrounding the thin portion.

In the present invention preferably the electricity storage pack has one of a front end and a rear end supported by the support member via the securing member. The electricity storage pack has the other end secured to the support member with a screw. The electricity storage pack has a screw hole formed to receive the screw. The screw hole is formed to extend in a longitudinal direction of a vehicular body.

Furthermore the present invention in another aspect provides a structure mounting (or attaching) an electricity storage pack on a vehicle, the electricity storage pack being secured to a support member by an attachment portion provided at each of one and the other ends of the electricity storage pack accommodating electricity storage equipment. One attachment portion has a disengagement portion for disengaging the support member and the electricity storage pack secured together at the attachment portion, and the other attachment portion includes a first attachment portion and a second attachment portion distant from each other. When physical impact is received at one of the first attachment portion and the second attachment portion, the electricity storage pack is disengaged from the support member at one attachment portion and deforms as the electricity storage pack pivots around one of the first attachment portion and the second attachment portion opposite to that receiving the physical impact.

Furthermore, the first attachment portion can include a slit portion allowing the electricity storage pack to move toward the second attachment portion when physical impact is received, and the second attachment portion can include a slit portion allowing the electricity storage pack to move toward the first attachment portion when physical impact is received.

Furthermore, the electricity storage pack is secured to the support member by one and the other attachment portions with an attachment bolt, and the disengagement portion can have a disengagement hole larger than the head of the attachment bolt.

Furthermore, one attachment portion has a slit portion allowing the electricity storage pack to move toward one of the first attachment portion and the second attachment portion when physical impact is received, and the slit portion can have an end having the disengagement portion.

Furthermore preferably the slit portion of the first and second attachment portions is larger in length than the slit portion of one attachment portion.

Furthermore, the slit portion has a lengthwise direction substantially parallel to a direction in which one of a vehicular body and the electricity storage pack receives physical impact, and furthermore, the first and second attachment portions may have a slit portion having a lengthwise direction oblique with respect to a direction in which one of a vehicular body and the electricity storage pack receives physical impact.

Furthermore, the present invention in still another aspect provides a structure mounting (or attaching) an electricity storage pack on a vehicle, the electricity storage pack being secured to a support member and accommodating electricity storage equipment therein. The support member includes an attachment portion for securing the electricity storage pack at one and the other ends to the support member. One attachment portion has a disengagement portion for disengaging the support member and the electricity storage pack secured together at the attachment portion, and the other attachment portion is configured of a first attachment portion and a second attachment portion distant from each other. When physical impact is received at one of the first attachment portion and the second attachment portion, the support member is disengaged from the electricity storage pack at one attachment portion to allow the electricity storage pack to pivot around one of the first attachment portion and the second attachment portion opposite to that receiving the physical impact and thus deform.

BRIEF DESCRIPTION OF THE DRAWINGS

FIG. 13A and FIG. 13B are schematic views for illustrating the battery pack rotationally deforming when it receives physical impact in the third embodiment.

FIG. 14A and FIG. 14B are schematic views for illustrating the battery pack in the third embodiment rotationally deforming when it receives physical impact.

BEST MODES FOR CARRYING OUT THE INVENTION

First Embodiment

Reference will now be made to FIG. 1 to FIG. 9 to describe a structure mounting an electricity storage pack on a vehicle in a first embodiment of the present invention.

A secondary battery, a capacitor or similar electricity storage equipment is accommodated in a case and thus mounted in a vehicle. In the present invention, equipment including the case and the electricity storage equipment accommodated in the case will be referred to as an electricity storage pack. The electricity storage pack may include other internal components including such as a cooling device such as a cooling duct, a cooling fan and the like for cooling the electricity storage equipment, electronics converting power, and the like.

Figure 1:
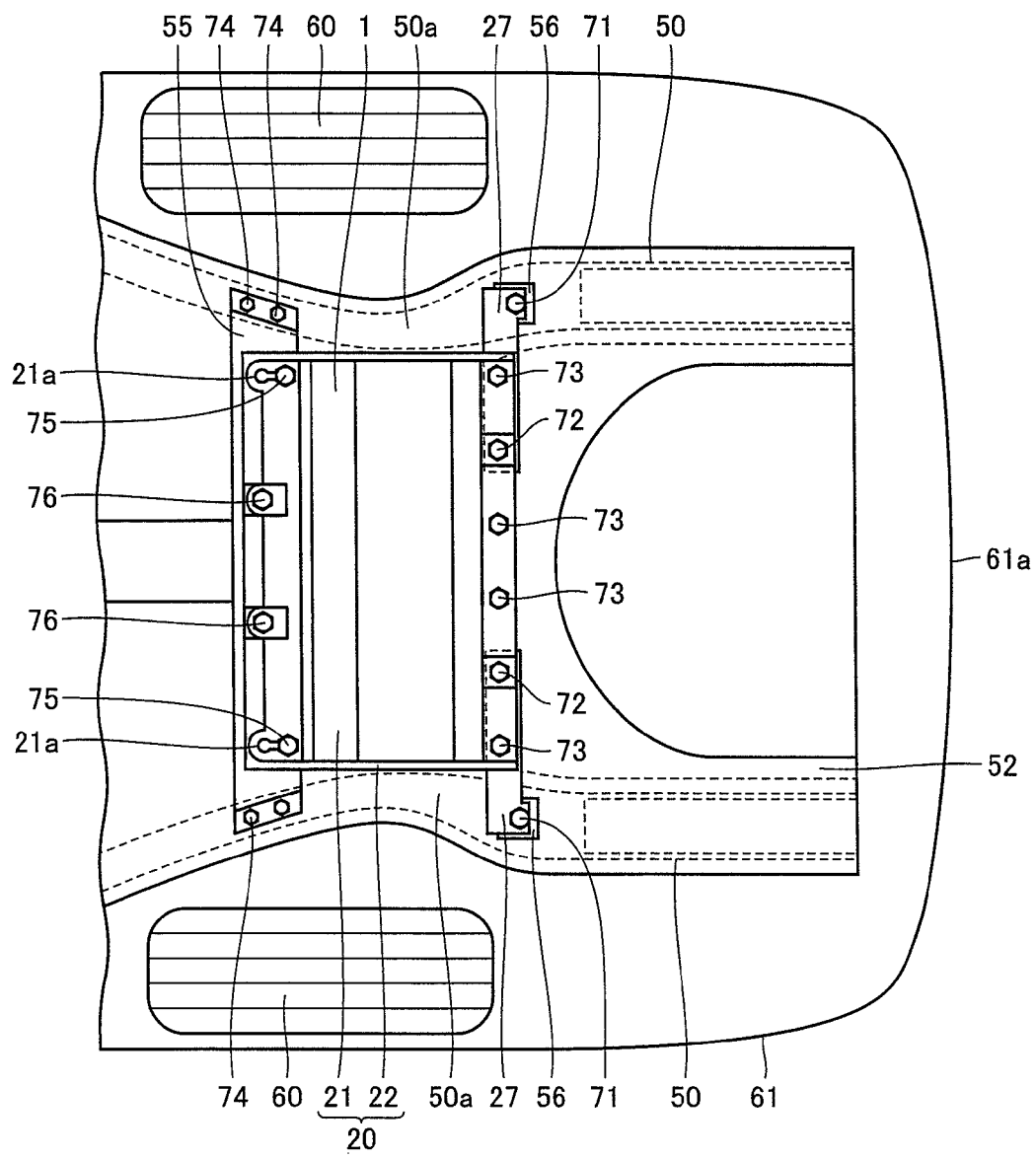
FIG. 1 is a first schematic cross section of the portion of a battery pack in a first embodiment of the present invention.

FIG. 1 is a schematic cross section of the portion of the battery pack in the present embodiment. FIG. 1 shows a rear portion of a vehicular body. In the present invention a so-called sedan vehicle will be described. The vehicle includes a body 61. Body 61 is formed to be generally a quadrangle when it is seen in a plane. Body 61 has a rear surface 61*a*. The vehicular body has a rear portion having a rear wheel 60.

In the present embodiment the electricity storage pack implemented as a battery pack 1 is disposed in the vehicular body at a rear portion. Battery pack 1 is disposed in a trunk room. Battery pack 1 includes a case implemented as a battery case 20. Battery case 20 internally accommodates electricity storage equipment implemented as a storage battery. While the present embodiment provides battery case 20 formed of iron, the electricity storage equipment's case may be formed of any material.

In the present embodiment the vehicle includes a support member formed to support battery pack 1. The support member includes a side member (or side frame) 50. Side member 50 configures a portion of the main body of the vehicular body. Side member 50 is disposed in the vehicular body at opposite sides as seen in the vehicular body's widthwise direction. Side member 50 extends in the vehicular body's longitudinal direction.

Battery pack 1 has a front end supported by side member 50 via a mount 55 and a floor member 52. Battery pack 1 has a rear end supported by side member 50 via a rear bracket 27, a mount 56 and floor member 52.

Side member 50 has an upper surface with floor member 52 disposed thereon. Floor member 52 is formed in the form of a plate. Floor member 52 is disposed to straddle a portion between side members 50 disposed in the vehicular body at the opposite sides as seen in the vehicular body's widthwise direction. Mounts 55, 56 are disposed on a surface of floor member 52.

In the present embodiment the vehicle includes rear bracket 27 as a securing member for securing battery pack 1 to side member 50. Rear bracket 27 is coupled to mount 56 with a screw implemented as a bolt 71. Mount 56 is secured to side member 50. Rear bracket 27 is coupled to battery pack 1 with a bolt 72. In the present embodiment rear bracket 27 is formed of iron.

In the present embodiment rear bracket 27 is formed to have a longitudinal direction. Rear bracket 27 is formed in the form of a plate. Rear bracket 27 is coupled to battery pack 1 at a rear end at opposite sides as seen in the widthwise direction. Rear bracket 27 is coupled to have its longitudinal direction substantially parallel to the vehicular body's widthwise direction.

Battery pack 1 has a front end connected to mount 55 with a bolt 75. Mount 55 extends in the vehicular body's widthwise direction. Mount 55 is formed to bridge two side members 50. Mount 55 is secured to side member 50 with a bolt 74.

Figure 2:
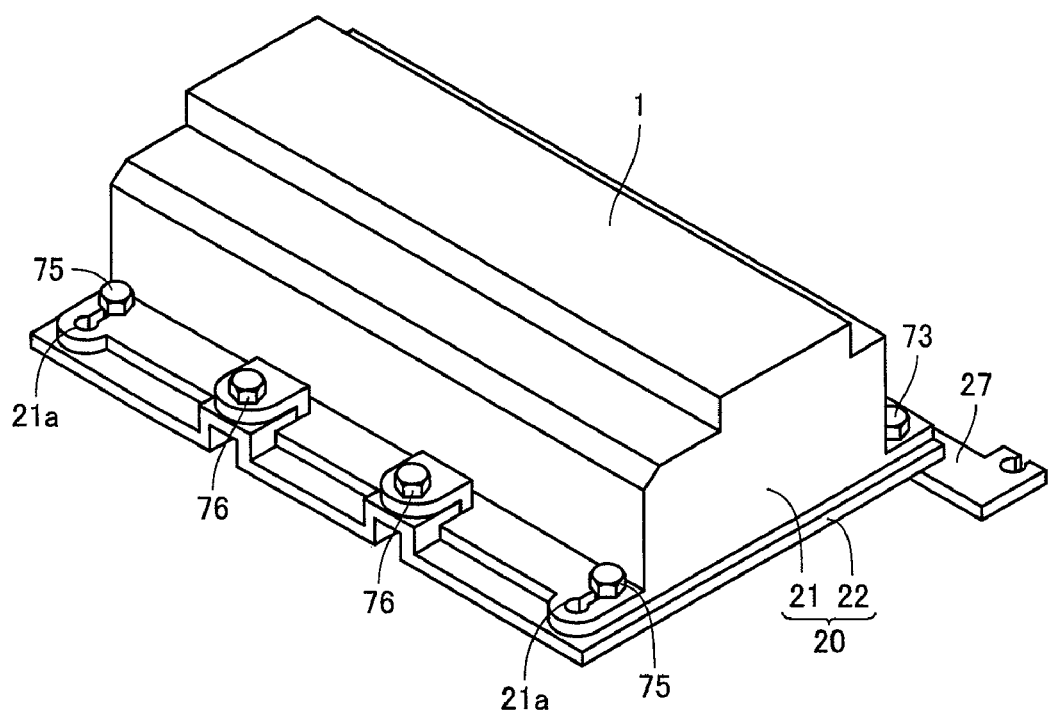
FIG. 2 is a schematic perspective view of the battery pack and a securing member in the first embodiment of the present invention.
Figure 3:
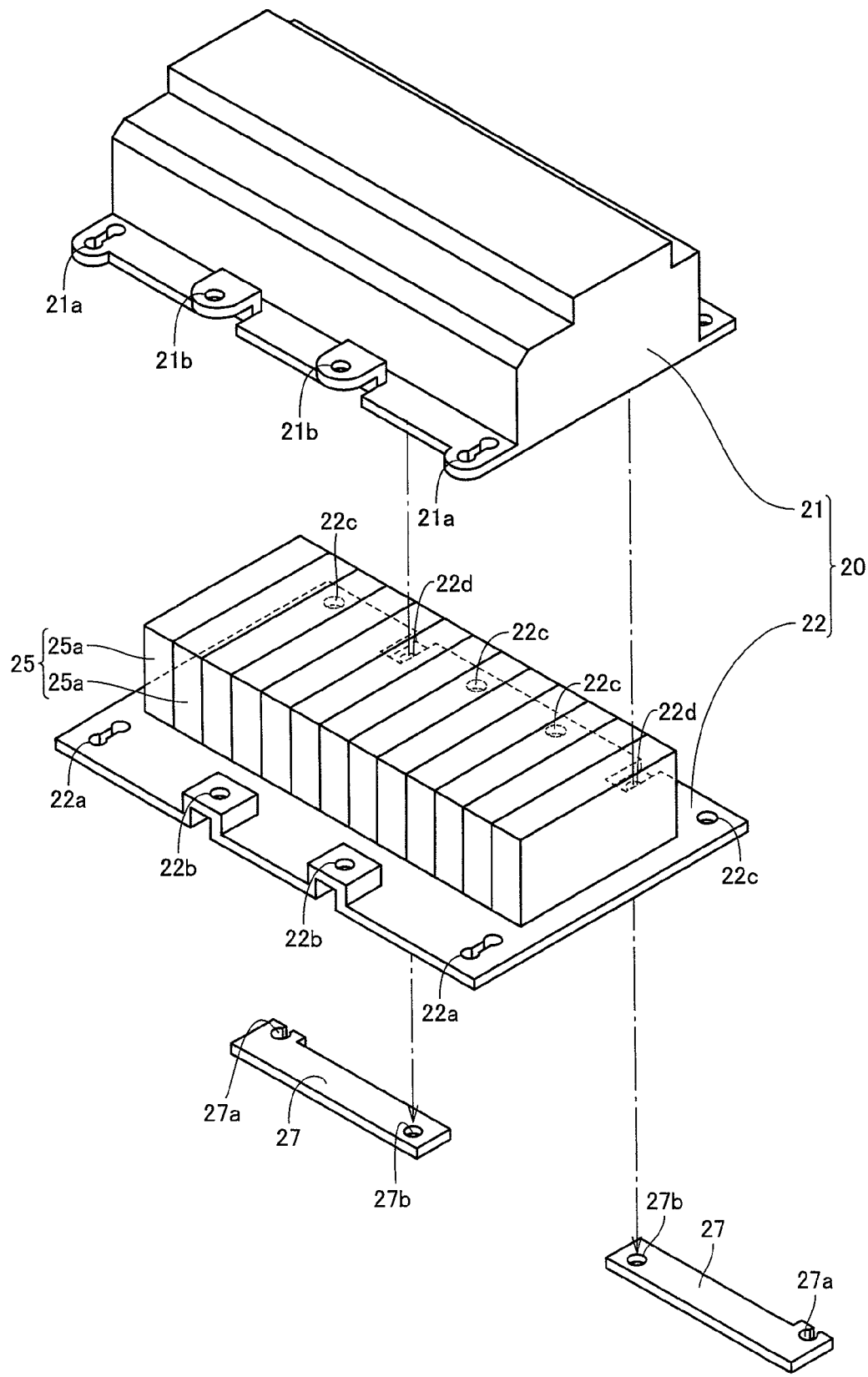
FIG. 3 is a schematic, exploded perspective view of the battery pack and the securing member in the first embodiment of the present invention.

FIG. 2 is a schematic perspective view of the battery pack and the rear bracket in the present embodiment. FIG. 3 shows an exploded perspective view of the battery pack and the rear bracket in the present embodiment. The battery pack 1 battery case 20 is in the form of a box. Battery case 20 includes an upper case 21 and a lower case 22. Rear bracket 27 has an outer end with a screw hole 27*a*. Rear bracket 27 has an inner end with a screw hole 27*b*.

Lower case 22 has an upper surface, on which electricity storage equipment implemented as a storage battery 25 is disposed. In the present embodiment, storage battery 25 includes a plurality of battery cells 25*a*. Battery cells 25*a* are stacked in layers. Upper case 21 covers storage battery 25.

With reference to FIG. 1 to FIG. 3, upper case 21 has a front end with screw holes 21*a*, 21*b*. Lower case 22 has a front end with screw holes 22*a*, 22*b*. Screw hole 21*a* and screw hole 22*a* have their respective positions to correspond to each other. Screw hole 21*b* and screw hole 22*b* have their respective positions to correspond to each other. Screw holes 21*b*, 22*b* receive screws implemented as a bolt 76 to fasten upper case 21 and lower case 22 together. Furthermore, screw holes 21*a*, 22*a* receive a bolt 75 to couple battery pack 1 to mount 55.

Lower case 22 has a rear end with screw holes 22*c*, 22*d*. Upper case 21 has a rear end having screw holes formed to correspond to screw holes 22*c*, 22*d*. Screw hole 22*c* and a screw hole of upper case 21 that corresponds thereto receive a bolt 73 to fasten upper case 21 and lower case 22 together. Furthermore, screw hole 22*d*, a screw hole of upper case 21 that corresponds thereto, and the rear bracket 27 screw hole 27*b* receives bolt 72 to fasten upper case 21 and lower case 22 together and also couple rear bracket 27 to battery case 20.

Figure 4:
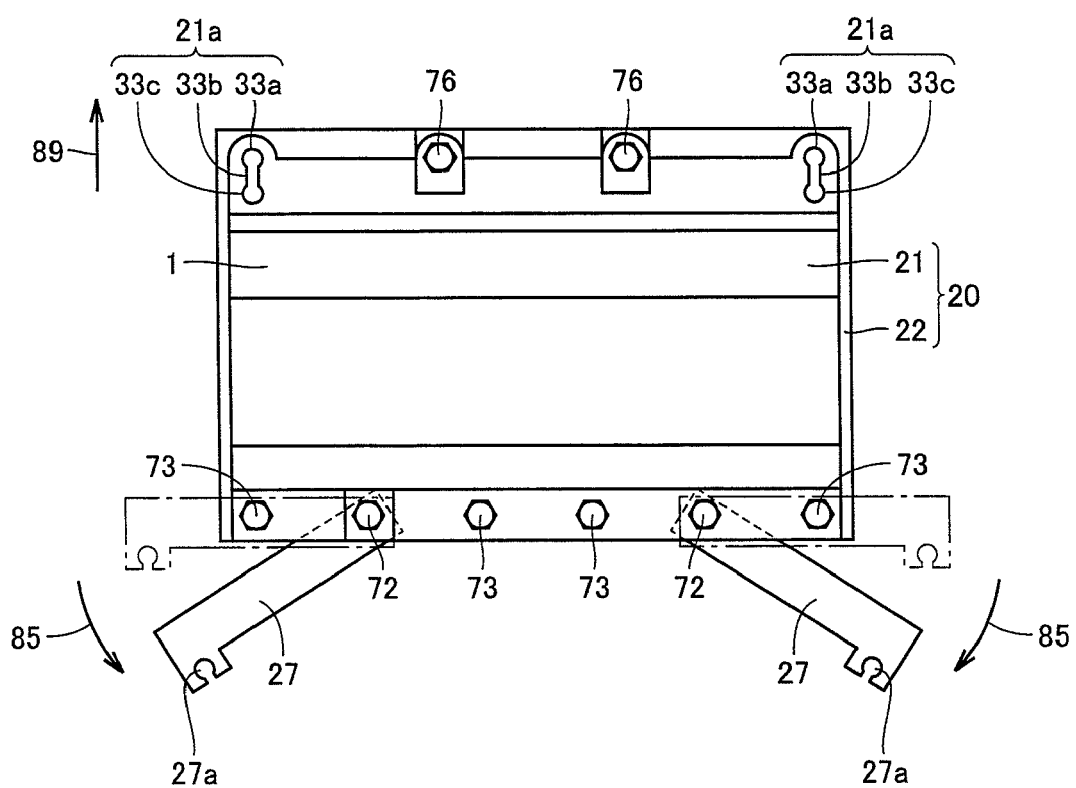
FIG. 4 is a schematic plan view of the battery pack and the securing member in the first embodiment of the present invention.

FIG. 4 is a schematic plan view of the battery pack and the rear bracket in the present embodiment. An arrow 89 indicates the vehicular body's front side. Upper case 21 and lower case 22 are fastened to each other with bolts 73, 76. Rear bracket 27 is coupled to battery pack 1 with bolt 72. Rear bracket 27 is coupled pivotably around bolt 72 serving as an axis of pivotation, as indicated by arrow 85.

Furthermore, in the present embodiment, with reference to FIG. 1, rear bracket 27 has an outer side coupled to side member 50 pivotably. Rear bracket 27 is connected to mount 56 pivotably around bolt 71 serving as an axis of pivotation. Thus in the present embodiment rear bracket 27 has one side coupled to battery pack 1 pivotably and the other side coupled to side member 50 pivotably.

With reference to FIG. 3 and FIG. 4, at a front end of battery pack 1 at opposite sides as seen in the widthwise direction, upper case 21 has screw hole 21*a* and lower case 22 has screw hole 22*a*. Screw holes 21*a*, 22*a* have a longitudinal direction. Screw holes 21*a*, 22*a* extend in the vehicular body's longitudinal direction. Screw hole 21*a* formed in upper case 21 and screw hole 22*a* formed in lower case 22 are substantially identical in geometry.

In the present embodiment screw holes 21*a*, 22*a* have a front round portion 33*a* and a rear round portion 33*c* communicating through a communication portion 33*b*. Front round portion 33*a* and rear round portion 33*c* are formed to have a diameter larger than a bolt's shank. Communication portion 33*b* is formed to have a width smaller than the bolt's shank. Before physical impact is received, screw 75 is located in rear round portion 33*c* (see FIG. 1).

Figure 5:
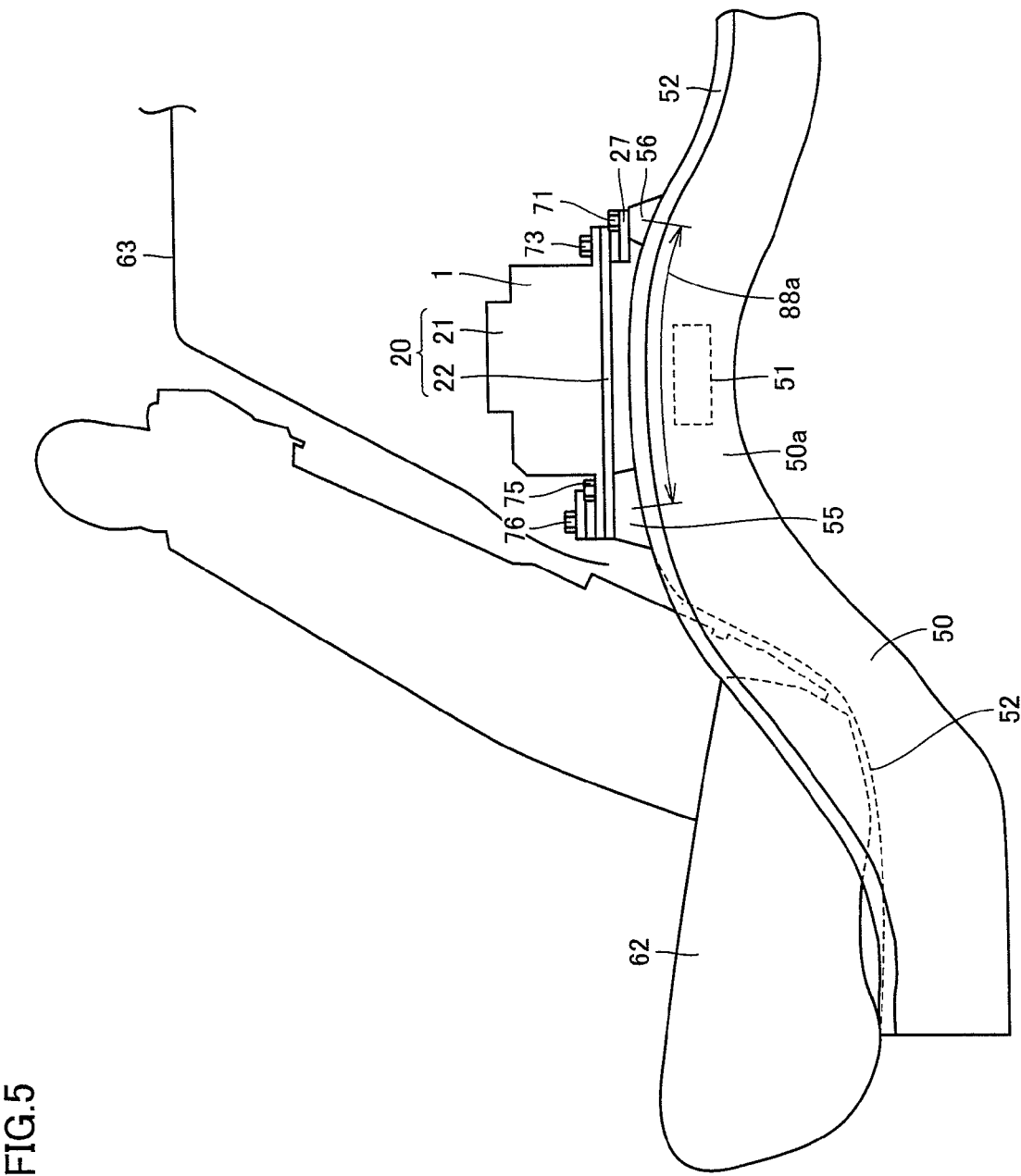
FIG. 5 is a second schematic cross section of the portion of the battery pack in the first embodiment of the present invention.

FIG. 5 is a second schematic cross section of a structure mounting a battery pack on a vehicle in the present embodiment. FIG. 5 is a schematic cross section provided when the vehicular body is cut along a plane extending in a vertical direction. Behind a rear seat 62 a partition panel 63 is disposed. Partition panel 63 partitions the cabin and the trunk room. In the present embodiment battery pack 1 is disposed in the trunk room.

Side member 50 has a kick up portion 50a formed to swell upward. Battery pack 1 is disposed at kick up portion 50a. Mounts 55, 56 are spaced by a distance indicated by an arrow 88a. Arrow 88a indicates a length extending along an upper surface of side member 50. Battery pack 1 is supported to be substantially horizontal when it is seen sideways.

Figure 6:
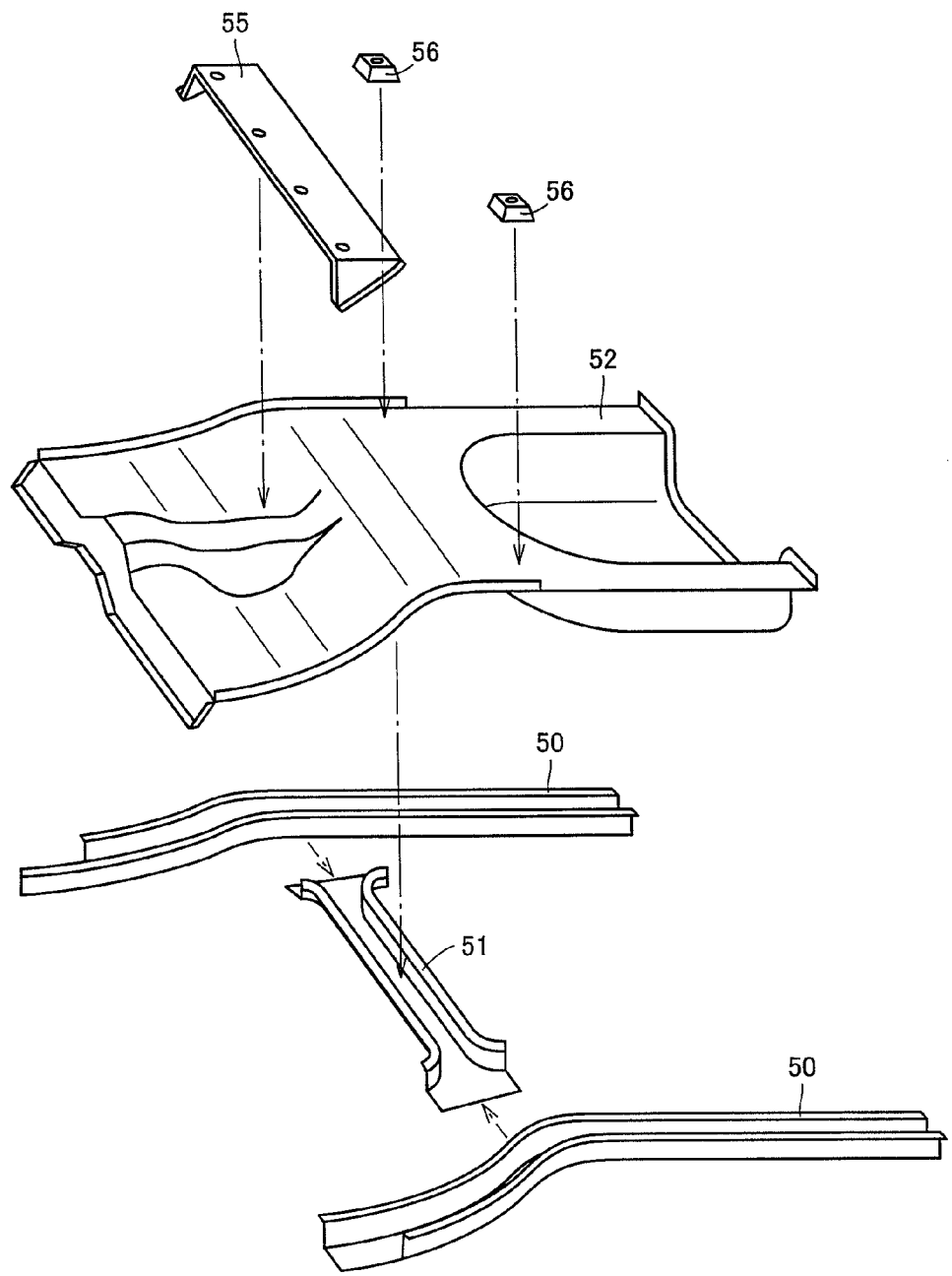
FIG. 6 is an exploded, schematic perspective view of a support member for supporting the battery pack in the first embodiment of the present invention.

FIG. 6 is a schematic, exploded perspective view of the support member in the present embodiment. In the present embodiment the support member includes side member 50, a cross member 51 and floor member 52. Cross member 51 secures side members 50 together. Floor member 52 is disposed on an upper surface of side member 50 and that of cross member 51.

In the present embodiment the support member includes mounts 55, 56. Mounts 55, 56 are secured to a surface of floor member 52. In the present embodiment, side member 50 is welded and thus secured to cross member 51. Floor member 52 is welded and thus secured to side member 50. Mounts 55, 56 are welded and thus secured to floor member 52.

Figure 7:
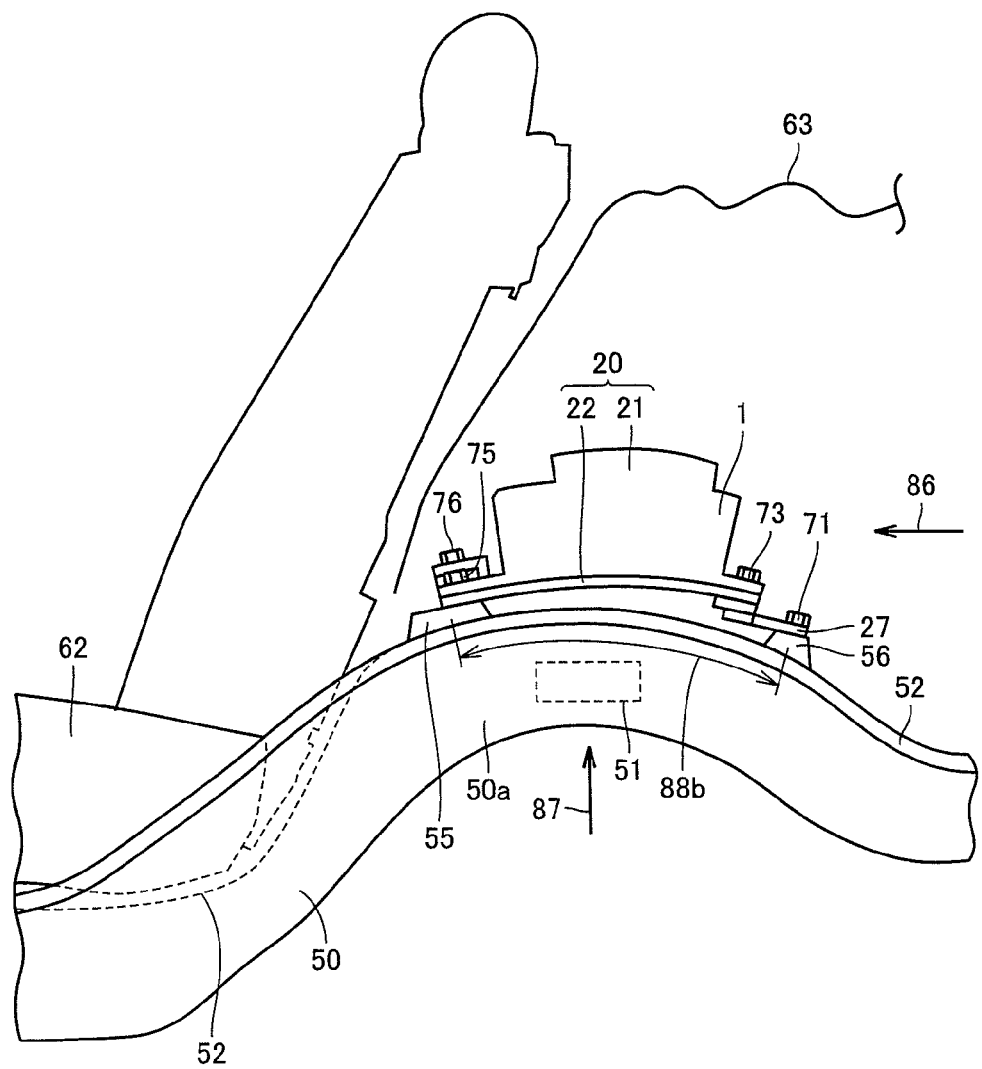
FIG. 7 is a first schematic cross section of the portion of the battery pack in the first embodiment when physical impact is experienced in the vehicular body's longitudinal direction.

FIG. 7 is a first schematic cross section of the vehicle of the present embodiment receiving a longitudinal physical impact. FIG. 7 is a view corresponding to FIG. 5. For example, if the longitudinal physical impact is received by the vehicular body at a rear portion as it is bumped by another vehicular body from behind, then, as indicated by an arrow 86, the vehicular body longitudinally receives a load. The side member 50 kick up portion 50a, curved upward, is further curved, as indicated by an arrow 87. At the time, a distance between mount 55 and mount 56, as indicated by an arrow 88b, is increased to be larger than that before the vehicle is bumped from behind. In the present embodiment battery case 20 deforms at the time.

Figure 8:
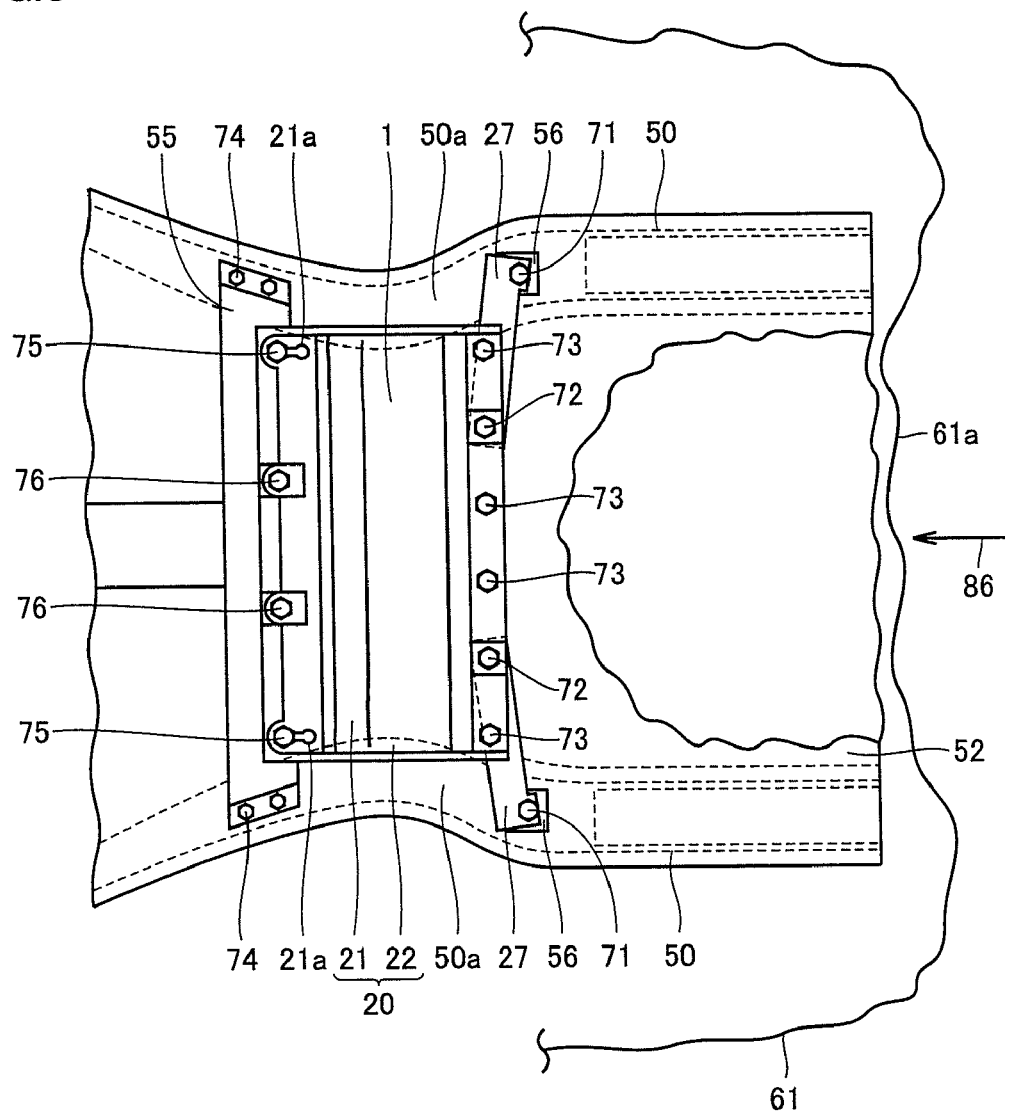
FIG. 8 is a second schematic cross section of the portion of the battery pack in the first embodiment when physical impact is experienced in the vehicular body's longitudinal direction.

FIG. 8 is a second schematic cross section of the vehicle of the present embodiment receiving a longitudinal physical impact. For example when the vehicle is bumped at the back, rear bracket 27 disposed behind battery pack 1 pivots. Rear bracket 27 has its lengthwise direction diverted from a position substantially parallel to the vehicular body's widthwise direction. Bolt 72 supporting rear bracket 27 positionally shifts relatively more forward than bolt 71 supporting rear bracket 27.

At the front side of battery pack 1, bolt 75 moves in screw hole 21a to front round portion 33a. More specifically, the bolt 75 shank moves from rear round portion 33c to front round portion 33a. In doing so, bolt 75 spreads communication portion 33b connecting front and rear round portions 33a, 33c together.

Thus the present embodiment provides a structure mounting an electricity storage pack on a vehicle, that allows the electricity storage pack to be supported in a manner varying to reduce damage to the electricity storage pack. In particular, the structure can prevent the electricity storage pack from coming off a support member.

While the above describes that a support member supporting an electricity storage pack is deformed by way of example, a similar effect can also be obtained when the electricity storage pack directly receives physical impact. For example, if the electricity storage pack is disposed in the trunk room, and the vehicle for example bumps into a preceding vehicle and a load placed in the trunk room collides directly against the electricity storage pack, the securing member can pivot to reduce damage to the electricity storage pack.

In the present embodiment the electricity storage pack is disposed in a vehicular body at a rear portion. This configuration can effectively reduce or prevent damage to the electricity storage pack when the vehicular body receives physical impact from behind. The vehicular body would receive physical impact mainly when it has collision at the front or the back. As well as vehicles bumping into each other, erroneous driving operation or the like would also cause the vehicle to crash into a building. Depositing the electricity storage pack in a vehicle at a front or rear portion that is an end portion as seen in a direction in which the vehicle travels renders the present invention's effect remarkable. If the electricity storage pack is disposed in the vehicular body at the front portion, the electricity storage pack is disposed for example in the engine room.

The present embodiment provides a securing member implemented as a bracket having a longitudinal direction substantially parallel to the vehicular body's widthwise direction. This configuration allows the securing member to efficiently pivot when the vehicular body receives longitudinal physical impact.

Furthermore in the present embodiment the battery pack has one end secured to a mount with a screw inserted into screw hole 21a (see FIG. 4) extending in the vehicle's longitudinal direction. Thus, when the electricity storage pack receives a load, the electricity storage pack can have one end moved relative to the screw to accommodate the support member's deformation.

While the electricity storage pack has a front end with a screw hole in the form of an elongate hole having a longitudinal direction, the screw hole is not limited thereto, and may for example be a round screw hole as seen in a plane. Furthermore, as will be described later, the screw hole may be surrounded by a thin portion.

While in the present embodiment a pivotably coupled securing member is coupled to an electricity storage pack at a rear side thereof, it is not limited thereto and may be disposed at any side. For example, if it is assumed that a load is exerted in a lateral direction of the vehicular body, the securing member may be disposed in the lateral direction of the vehicular body.

Figure 9:
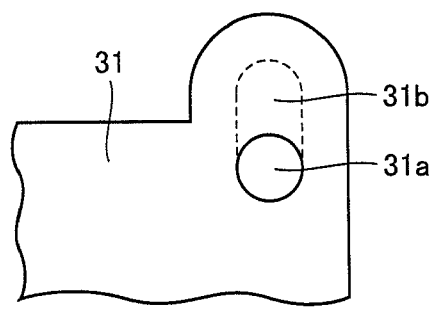
FIG. 9 is an enlarged schematic plan view of another screw hole receiving a screw securing the electricity storage pack to the support member in the first embodiment.

FIG. 9 is an enlarged schematic plan view of a screw hole of another electricity storage pack in the present embodiment. This electricity storage pack has an upper case 31. Upper case 31 has a screw hole 31a. Screw hole 31a is a portion corresponding in the FIG. 4 upper case 21 to screw hole 21a. Screw hole 31a is formed to be substantially round as seen in a plane.

Screw hole 31a is surrounded by a thin portion 31b. Thin portion 31b is formed to be smaller in thickness than a portion outer than and surrounding thin portion 31b. Thin portion 31b has a longitudinal direction. Thin portion 31b extends in the vehicular body's longitudinal direction. Thin portion 31b is provided forwardly of screw hole 31a. A lower case is also similarly configured. More specifically, the upper and lower cases have their respective screw holes surrounded by thin portions, respectively.

A screw hole receiving a screw securing the electricity storage pack to the support member that is surrounded by a thin portion allows the screw's shank in the screw hole to move when the vehicular body receives physical impact. This tears thin portion 31b and thus allows the electricity storage pack to follow the support member's deformation. Alternatively the physical impact's energy can be absorbed as the screw's shank travels thin portion 31b.

While in the present embodiment the electricity storage pack has a case formed to be deformable, it is not limited thereto. In addition to the case, the securing member implemented as a bracket may also be formed to be deformable. The securing member can be formed of any material.

Second Embodiment

Figure 10:
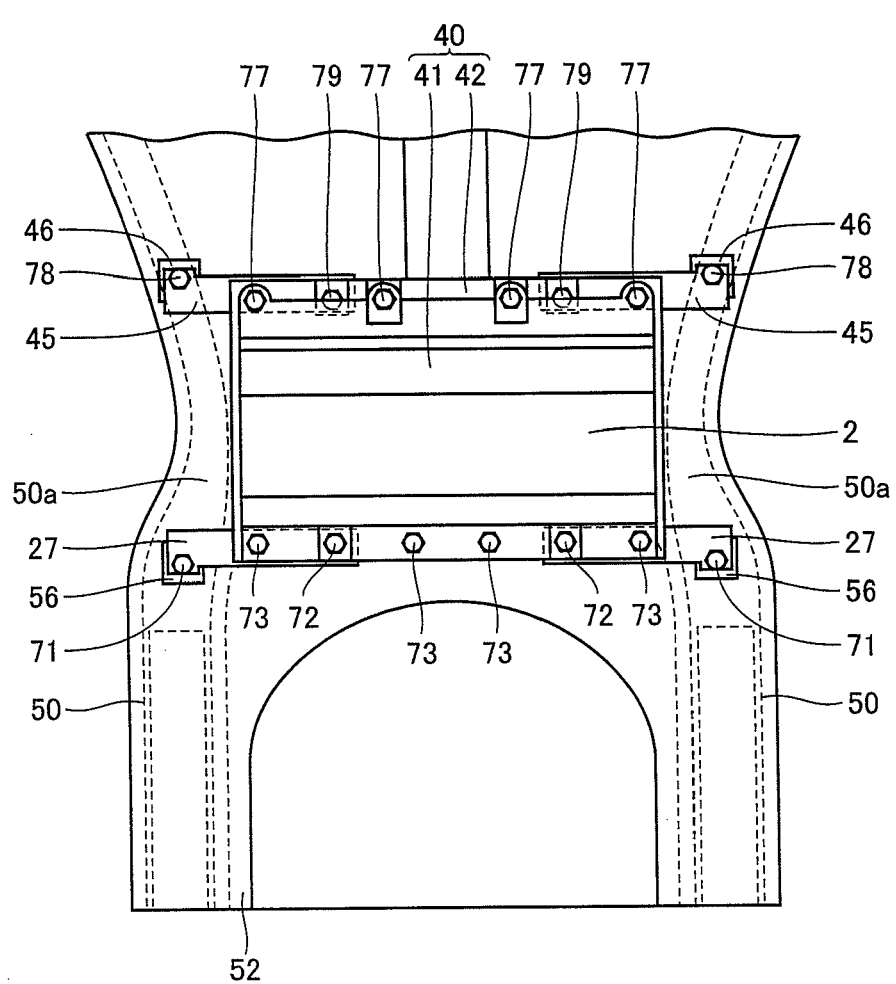
FIG. 10 is a schematic cross section of the portion of a battery pack in a second embodiment of the present invention.

With reference to FIG. 10, the present invention in a second embodiment provides a structure mounting an electricity storage pack on a vehicle, as will be described hereinafter. The present embodiment provides a structure mounting an electricity storage pack on a vehicle, that supports the electricity storage pack's front portion by a structure different from that described in the first embodiment.

FIG. 10 is a schematic cross section of a structure mounting a battery pack on a vehicle in the present embodiment. In the present embodiment the structure mounting a battery pack on a vehicle employs four securing members to secure a battery pack to a support member.

The structure mounting a battery pack on a vehicle includes a securing member implemented as a front bracket 45 disposed at a front end of a battery pack 2. Battery pack 2 includes an upper case 41 and a lower case 42. Upper case 41 and lower case 42 are fastened together by bolts 73, 77.

Front bracket 45 is pivotably coupled to lower case 42 with a bolt 79. Front bracket 45 is pivotably coupled to a mount 46 with a bolt 78. Mount 46 is each disposed at opposite sides as seen in the widthwise direction, and secured to side member 50.

Thus a pivotable securing member can be disposed at an end, as seen in a direction in which it is assumed that the vehicular body receives physical impact, to alone support the electricity storage pack to also reduce or prevent damage to the electricity storage pack against large physical impact. For example it can ensure less or no damage to the electricity storage pack for example when the support member significantly deforms.

The remainder in configuration, and function and effect is similar to that of the structure mounting an electricity storage pack on a vehicle in the first embodiment. Accordingly it will not be described repeatedly. Furthermore, in the above described figures, identical or corresponding components are identically denoted.

Third Embodiment

With reference to FIG. 11 to FIG. 14B, the present invention in a third embodiment provides a structure mounting (or attaching) an electricity storage pack to a vehicle, as will be described hereinafter.

Figure 11:
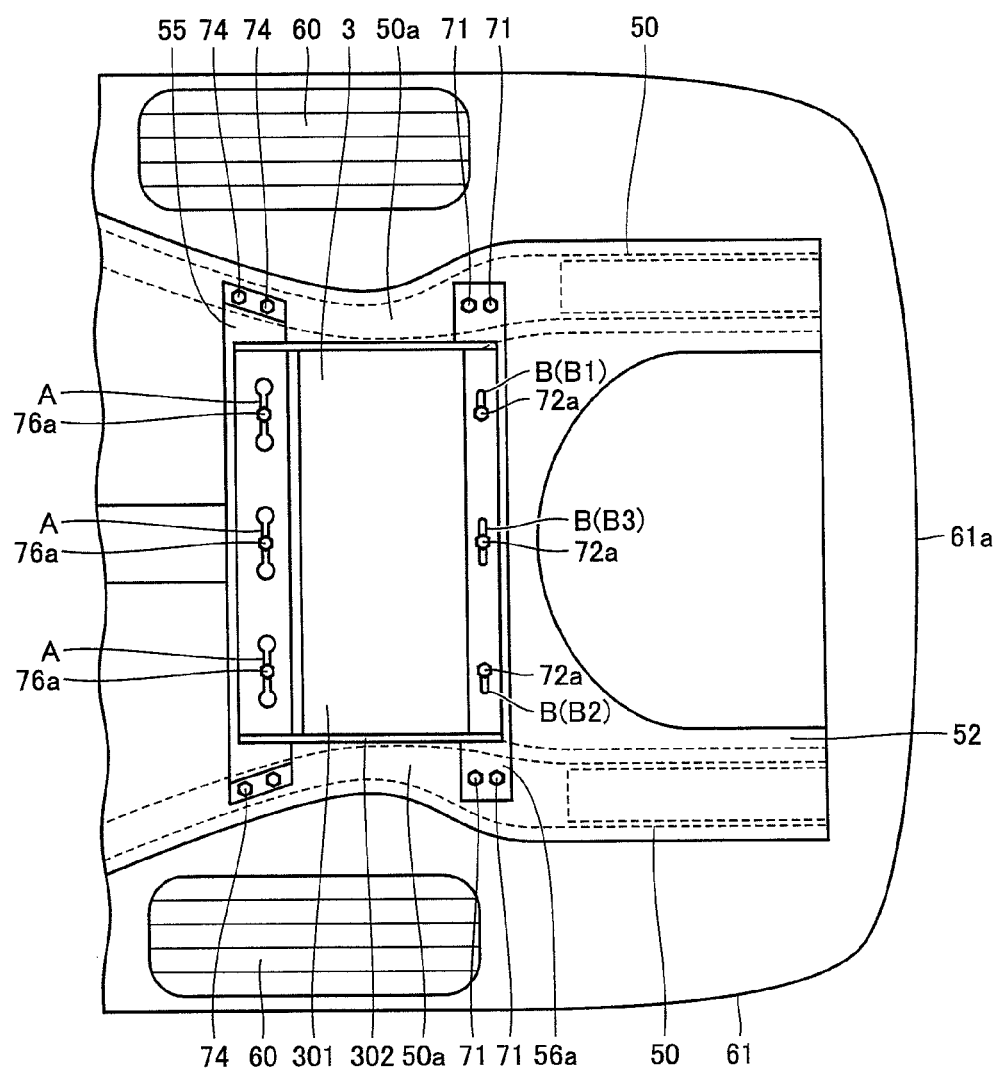
FIG. 11 is a schematic cross section of a battery pack mounted in a vehicular body in a third embodiment of the present invention.

With reference to FIG. 11, the present embodiment provides a structure mounting an electricity storage pack on a vehicle, that has an electricity storage pack implemented as a battery pack 3 having an end closer to the front side of the vehicular body that is supported by side member 50 via mount 55 and floor member 52, and an end closer to the rear side of the vehicular body that is supported by side member 50 via a mount 56a and floor member 52, rather than rear bracket 27 described in the first embodiment. The remainder in configuration similar to that of the first embodiment will be identically labeled and will not be described repeatedly.

The present embodiment provides battery pack 3 including an upper case 301 and a lower case 302. Similarly as has been described in the first embodiment, on an upper surface of lower case 302 is disposed electricity storage equipment implemented as a storage battery 25 including a plurality of battery cells 25a stacked in layers, and upper case 301 covers storage battery 25. Upper case 301 and lower case 302 each have ends closer to the front and rear sides, respectively, of the vehicular body that have attachment portions A, B (B1, B2, B3) receiving bolts 76a and 72a to secure battery pack 3 to the support member implemented as mount 55 and mount 56a. Furthermore, upper case 301 and lower case 302 are also fastened together. Upper case 301 and lower case 302 are configured of aluminum metal or a similar material.

Figure 12:
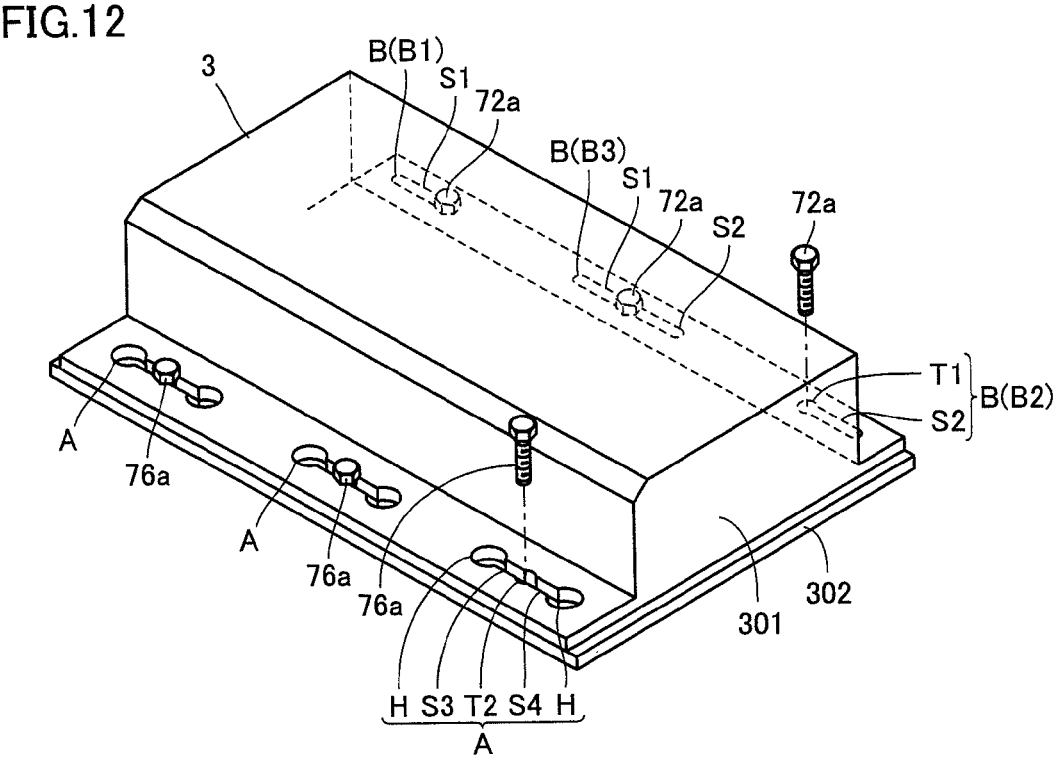
FIG. 12 is a schematic perspective view of the battery pack in the third embodiment of the present invention.

As shown in FIG. 12, attachment portion A includes an attachment hole T2 receiving the shank of bolt 76a, slits S3 and S4 extending in battery pack 3 in a widthwise direction of the vehicular body, and a disengagement hole H having a diameter larger than the head of bolt 76a. Slits S3, S4 are elongate holes adjacent to attachment hole T2 receiving bolt 76a, such that they are opposite to each other in the widthwise direction of the vehicular body to sandwich attachment hole T2, and couple attachment hole T2 and disengagement hole H together. Furthermore, in the present embodiment, attachment portion A is provided in the end portion of battery pack 3 closer to the front side of the vehicular body, at three attachment positions, and slits S3, S4 are equal in length.

Attachment portion B is provided in the end portion of battery pack 3 closer to the rear side of the vehicular body at three attachment positions and includes an attachment hole T1 receiving the shank of bolt 72a and a slit S1 or/and S2 extending in battery pack 3 in the widthwise direction of the vehicular body. As shown in FIG. 11 and FIG. 12, of three attachment portions B, an attachment portion B1 (or a first attachment portion) includes a slit S1 coupled to attachment hole T1 and extending rightward (in FIG. 11, upward) in the widthwise direction of the vehicular body. An attachment portion B2 (a second attachment portion) includes a slit S2 that couples to attachment hole T1 distant from attachment portion B1 and extends leftward (in FIG. 11, downward) in the widthwise direction of the vehicular body and hence in a direction opposite to that in which slit S1 extends. An attachment portion B3 is located between attachment portion B1 and attachment portion B3 and includes slit S1 and slit S2 adjacent to attachment hole T1 opposite as seen in the widthwise direction of the vehicular body.

Thus attachment portion B1 has slit S1 formed to be an elongate hole that allows battery pack 3 receiving physical impact at a side closer to attachment portion B1 to displace (or deform) toward attachment portion B2 and does not allow battery pack 3 receiving physical impact at a side closer to attachment portion B2 to displace toward attachment portion B1, and attachment portion B2 also has slit S2 formed to be an elongate hole that allows battery pack 3 receiving physical impact at a side closer to attachment portion B2 to displace toward attachment portion B1 and does not allow battery pack 3 receiving physical impact at a side closer to attachment portion B1 to displace toward attachment portion B2.

Furthermore the elongate holes of slits S1 and S2 of attachment portion B are larger in length than those of slits S3 and S4 of attachment portion A, as seen in their lengthwise direction, and slits S1-S4 have their lengthwise direction substantially parallel to a direction in which the vehicular body or battery pack 3 receives physical impact.

In the present embodiment battery pack 3 is secured to a support member at attachment portions A, B having attachment portion A provided with disengagement hole H having a diameter larger than the head of bolt 76a for disengaging the support member and battery pack 3 secured together at attachment portion A, and attachment portion B including first attachment portion B1 and second attachment portion B2 distant from each other. When physical impact is received at a side closer to first attachment portion B1 or that closer to second attachment portion B2, battery pack 3 can be disengaged from the support member at attachment portion A, and battery pack 3 as described above, i.e., battery pack 3 accommodating an electricity storage device implemented as storage battery 25, can have upper case 301 and lower case 302 deformed such that the cases pivot around first attachment portion B1 or second attachment portion B2 that is opposite to that receiving the physical impact (and that end of battery pack 3 which has attachment portion A acts as a free end). Thus the physical impact can be absorbed and dispersed and battery pack 3 can suitably be protected.

Furthermore, as shown in FIG. 11, while the present embodiment assumes that a vehicular body receives physical impact laterally or in a widthwise direction of the vehicular body relative to a longitudinal direction of the vehicular body, i.e., that a vehicle is bumped sideways, and battery pack 3 thus receives a load of physical impactive force, the structure mounting an electricity storage pack on a vehicle in the present embodiment is applicable to physical impact or collision acting on battery pack 3 in a direction substantially parallel to that in which the elongate holes of the slits of attachment portions A and B have their respective lengthwise directions, and it is also applicable to a load of physical impactive force exerted on battery pack 3 in the longitudinal direction of the vehicular body if attachment portions A, B and their slits' lengthwise directions are modified to accommodate the physical impact exerted in the longitudinal direction of the vehicular body.

Reference will now be made to FIG. 13A and FIG. 13B to describe how battery pack 3 of the present embodiment behaves when it receives physical impact. An arrow 501 indicates a direction in which the physical impact is exerted. An arrow 502 indicates how battery pack 3 deforms. An arrow 503 indicates how battery pack 3 slides. An arrow 504 indicates how battery pack 3 slidingly and compressively deforms.

If in the FIG. 13A condition the vehicular body or battery pack 3 receives physical impact in the widthwise direction of the vehicular body at a side closer to attachment portion B2, then, as shown in FIG. 13B, battery pack 3 elastically and plastically deforms and thus displaces (or deforms) in a direction in which the physical impactive force acts. As battery pack 3 displaces, the shank of attachment bolt 76a in attachment portion A passes through slit S4 and thus reaches disengagement hole H. This causes a physical impact causing the head of attachment bolt 76a to come off disengagement hole H, and mount 55 and battery pack 3 at attachment portion A are disengaged (or the force of bolt 76a fastening mount 55 and battery pack 3 together is released).

At attachment portion B, on the other hand, while battery pack 3 as a whole displaces rightward (in the figure, upward), the attachment portion B1 slit S1 does not allow the physical impact received from the side closer to attachment portion B2 to displace battery pack 3 rightward (in the figure, upward) and the attachment portions B2 and B3 slits S2 allow the physical impact received from the side closer to attachment portion B2 to displace battery pack 3 rightward (in the figure, upward), as has been described above, and upper case 301 and lower case 302 (compressively) deform in a vicinity of attachment portion B2 and attachment portion B3 to allow battery pack 3 to displace rightward (in the figure, upward).

Thus, as shown in FIG. 13B, when battery pack 3 receives physical impact at the side closer to second attachment portion B2, attachment portion A comes off mount 55 and attachment portion B1 prevents battery pack 3 from moving toward attachment portion B1. Battery pack 3 pivots around bolt 72a of attachment portion B1, while battery pack 3 deforms, and thus absorbs and disperses the physical impact. As attachment portion B1 prevents battery pack 3 from moving toward attachment portion B1, battery pack 3 does not entirely displace toward attachment portion B1. Rather, battery pack 3 deforms such that it pivots around bolt 72a of attachment portion B1, and upper case 301 and lower case 302 compressively deform (or compressively displace) in a vicinity of attachment portion B2 and attachment portion B3.

In the present embodiment when the vehicular body or battery pack 3 receives physical impact at attachment portion B2 the structure mounting an electricity storage pack on a vehicle allows battery pack 3 to displace as it deforms gradually such that it pivots around bolt 72a of attachment portion B1, i.e., an attachment portion opposite to attachment portion B2 receiving the physical impact. This can appropriately absorb and disperse energy with respect to physical impact and hence prevent physical impact from excessively deforming battery pack 3. Note that when physical impact deforms battery pack 3, the second attachment portion implemented as attachment portion B2 may come off the support member. More specifically, when the second attachment portion implemented as attachment portion B2 comes off the support member, battery pack 3 having plastically deformed has sufficiently absorbed physical impact. Accordingly, attachment portion B2 may be configured to come off the support member before upper case 301 and lower case 302 rapture as they plastically deform.

Furthermore, the attachment portion B slits S1 and S2 each have an elongate hole having in its lengthwise direction a length larger than the attachment portion A slits S3 and S4 each do. This ensures that battery pack 3 receiving physical impact and thus displacing displaces slidingly in a direction in which the physical impact acts, until the shank of attachment bolt 76a in attachment portion A passes through slit S3 or S4 and reaches disengagement hole H and thus causes physical impact causing the head of attachment bolt 76a to come off disengagement hole H, so that the head of bolt 76a can readily come off disengagement hole H. Note that slits S3 and S4 may each have an elongate hole having a width larger at portions closer to disengagement hole H than those closer to attachment hole T2 so that the slits can have a width increasing from attachment hole T2 toward disengagement hole H.

Furthermore while FIG. 11 to FIG. 13B show slits S1-S4 having a lengthwise direction substantially parallel to a direction in which the vehicular body or battery pack 3 receives physical impact, attachment portion B1 and attachment portion B3 may have slits S1 and S2 having a lengthwise direction oblique relative to the direction in which the vehicular body or battery pack 3 receives physical impact, as shown in FIG. 14A and FIG. 14B as slits S1a, S2a. The slits may have a linear geometry or a curved geometry having a curvature.

More specifically, to allow battery pack 3 to displace while gently deforming such that it pivots around bolt 72a of attachment portion B1, i.e., an attachment portion that is opposite to attachment portion B2 receiving physical impact when the vehicular body or battery pack 3 receives the physical impact at attachment portion B2, slit S1a or S2a may have a lengthwise direction that is perpendicular to a direction in which the vehicular body or battery pack 3 receives the physical impact and that inclines toward attachment portion A to increase the displaceability of battery pack 3 receiving the physical impact (i.e., the displaceability of battery pack 3 at attachment portion B2 in the vehicular body's longitudinal direction) and reduce the deformability of battery pack 3, and also achieve more appropriate absorption and dispersion of energy with respect to physical impact.

Note that when battery pack 3 is allowed to displace in a direction perpendicular to that in which the vehicular body or battery pack 3 receives physical impact, more appropriate absorption and dispersion of energy with respect to the physical impact can be achieved. Accordingly, slits S1 and S2 may be formed for example in the letter of T or a cross.

Alternatively, attachment portion A may be configured to dispense with slits S2 and S3 and have disengagement hole H and attachment hole T2 adjacently. Alternatively, attachment portions A, B may dispense with attachment holes T1, T2 receiving the shanks of bolts 76a and 72a and instead have their slits' elongate holes to also serve as attachment holes T1, T2 to receive the shanks of bolts 76a and 72a.

Furthermore, one of upper case 301 and lower case 302 may have attachment holes A and B and the other of the cases that has no attachment hole may be configured to be secured to that having the attachment holes, and the support member and one of the cases may be secured together.

Furthermore while in the present embodiment battery pack 3 has ends each having attachment portions at three attachment positions, battery pack 3 may have ends each having attachment portions at least two positions in view of ensuring that battery pack 3 and the support member are firmly secured together.

Fourth Embodiment

With reference to FIG. 15 to FIG. 18B, the present invention in a fourth embodiment provides a structure mounting (or attaching) an electricity storage pack on a vehicle, as will be described hereinafter.

Figure 15:
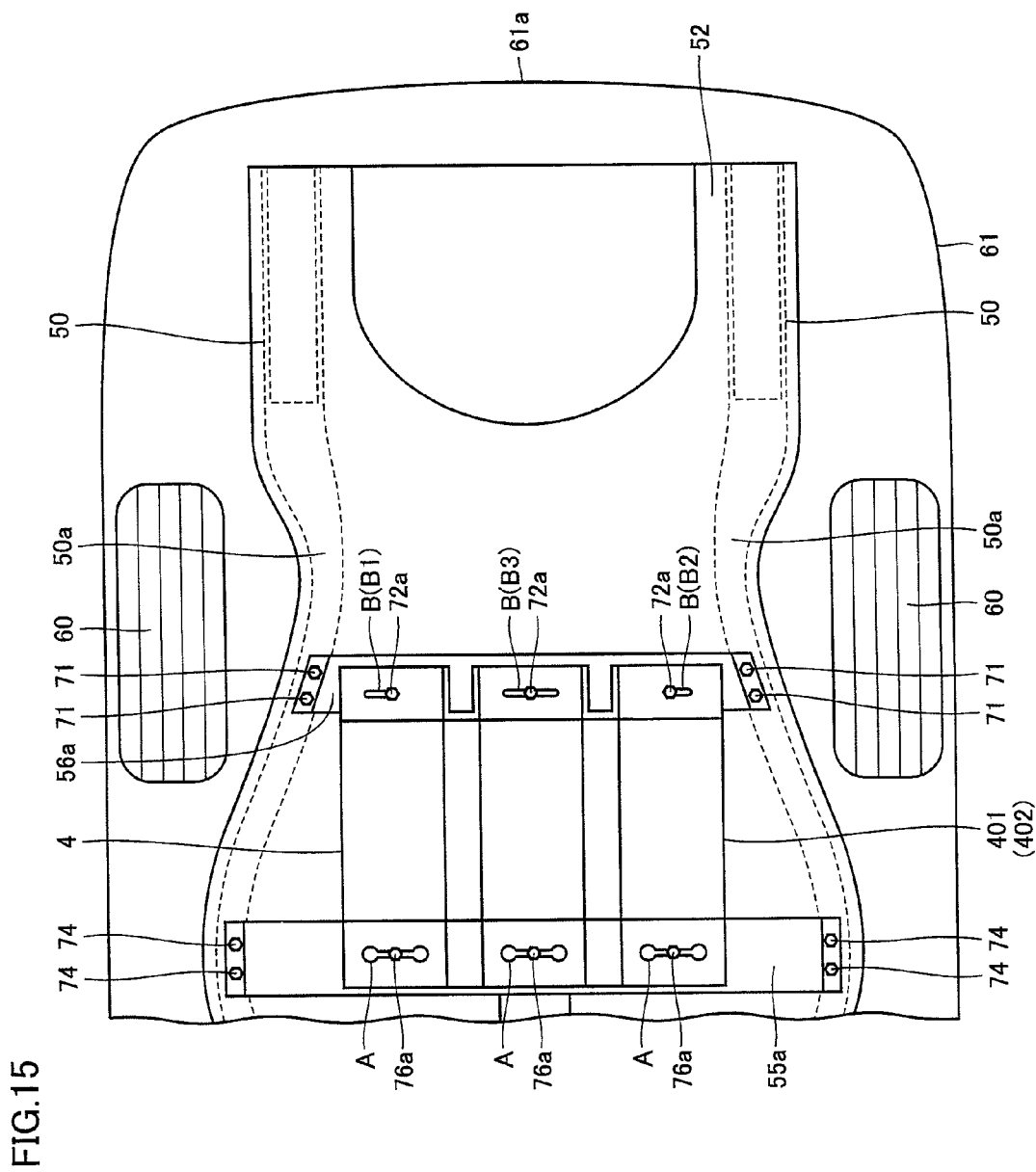
FIG. 15 is a schematic cross section of a battery pack mounted in a vehicular body in a fourth embodiment of the present invention.
Figure 16:
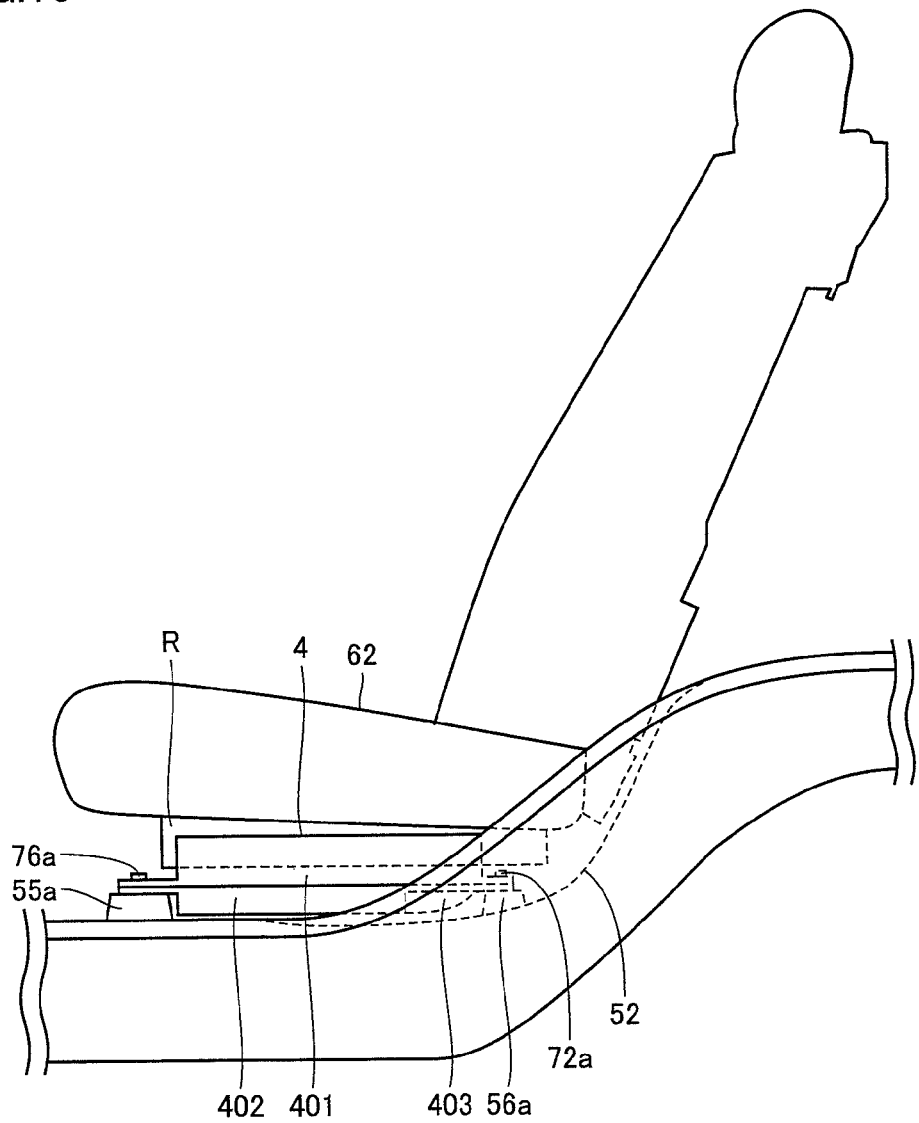
FIG. 16 is a schematic cross section of the battery pack mounted in the vehicular body in the fourth embodiment of the present invention.

As shown in FIG. 15 and FIG. 16, the present embodiment provides an electricity storage pack implemented as a battery pack 4 disposed in a vehicular body under a rear seat and having an end closer to a front side of the vehicular body that is supported by side member 50 via a mount 55a and floor member 52, and an end closer to a rear side of the vehicular body that is supported by side member 50 via a mount 56a and floor member 52. The remainder in configuration similar to that described in the first or third embodiment will be denoted identically and will not be described.

Figure 17:
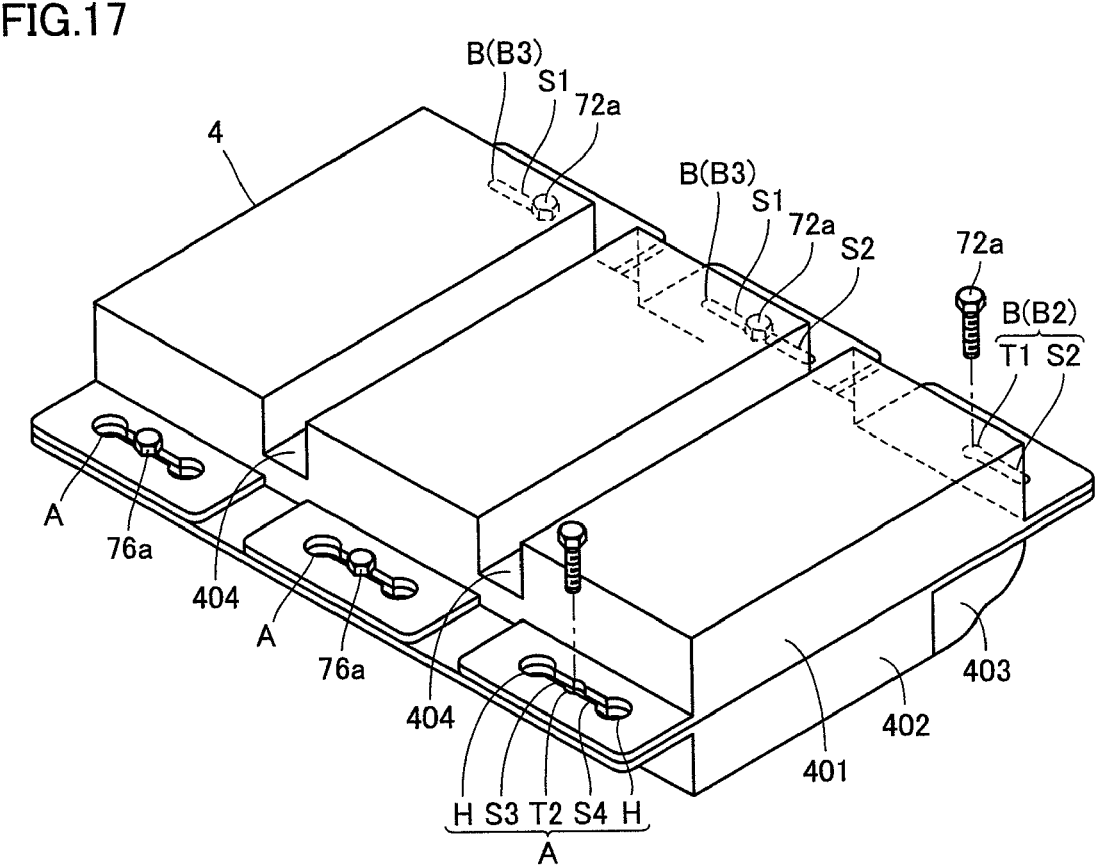
FIG. 17 is a schematic perspective view of the battery pack in the fourth embodiment of the present invention.
Figure 18A:
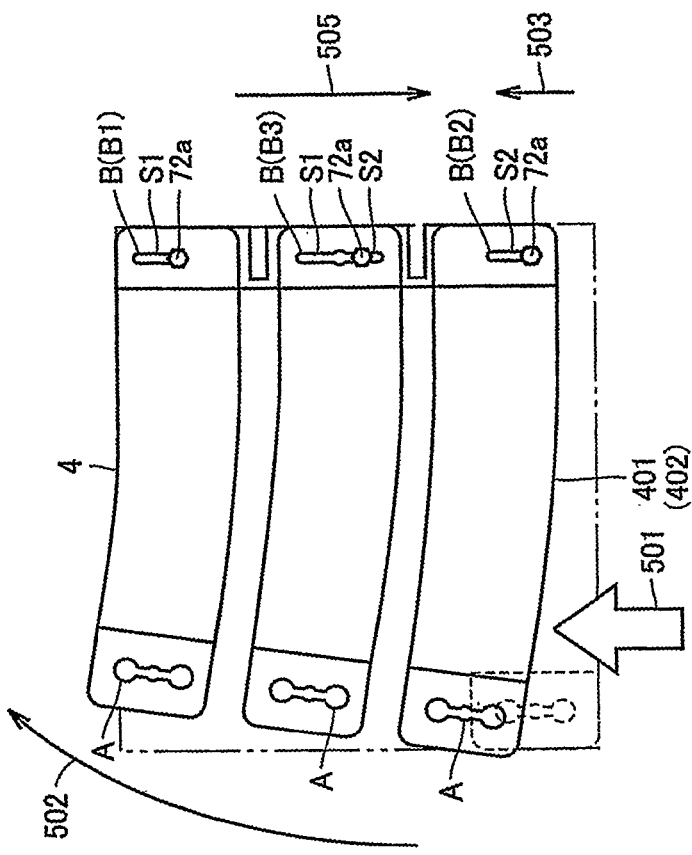
FIG. 18A and FIG. 18B are schematic views for illustrating the battery pack in the fourth embodiment rotationally deforming when it receives physical impact.
Figure 18B:
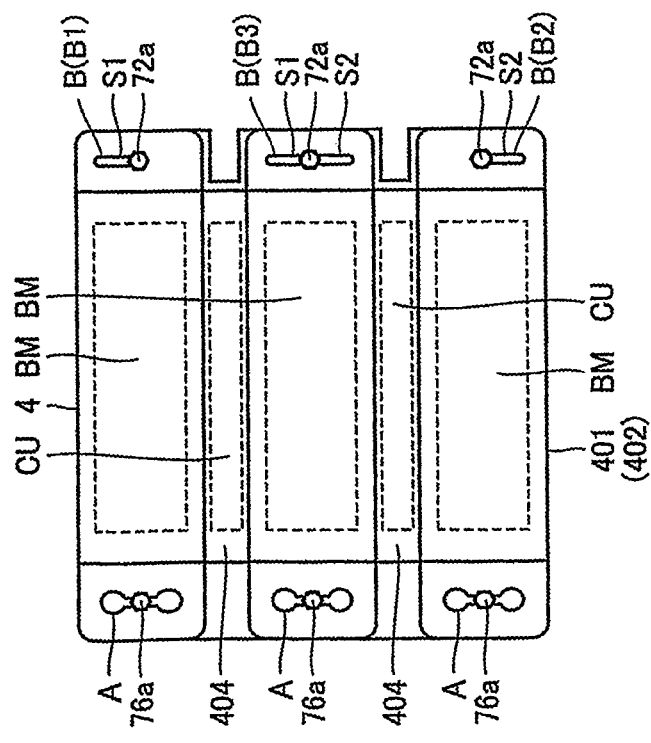

In the present embodiment battery pack 4 includes an upper case 401 and a lower case 402, and, as shown in FIG. 17 to FIG. 18B, a plurality of storage batteries 25 implemented as a battery module BM are disposed at predetermined intervals, with a control unit (a monitoring unit) CU posed therebetween. Upper case 401 is formed to be lower at a portion covering control unit CU than that covering battery module BM, and thus has a recess between battery modules BMs.

Typically under a seat a slide mechanism (or a rail R) is provided to allow the seat to slide. In the present embodiment battery pack 4 allows rail R projecting from the seat downward to be disposed in the recess (or a rail passing portion 404) that is provided between battery modules BMs and hence in an efficiently utilized space.

Battery pack 4 including upper case 401 and lower case 402 thus formed, as well as that in the third embodiment, has upper case 401 and lower case 402 such that their respective ends closer to the front side of the vehicular body and their respective ends closer to the rear side of the vehicular body have attachment portions A and B (B1, B2, B3) receiving bolt 76a and bolt 72a, respectively. Bolt 76a and bolt 72a secure battery pack 4 to a support member implemented as mount 55a and mount 56a and also fasten upper case 401 and lower case 402 together. Furthermore, upper case 401 and lower case 402 are formed of aluminum metal or a similar material. Furthermore, lower case 402 is provided with an air flow guiding portion 403 for introducing air having flown through battery pack 4, and discharging the air outside battery pack 4.

With reference to FIG. 18A and FIG. 18B, in the present embodiment when battery pack 4 receives physical impact, battery pack 4 behaves, as will be described hereinafter. An arrow 501 indicates a direction in which the physical impact is exerted. An arrow 502 indicates how battery pack 3 deforms. An arrow 503 indicates how battery pack 3 slides. An arrow 505 indicates how battery pack 3 slidingly and compressively deforms.

If in the FIG. 18A condition the vehicular body or battery pack 4 receives physical impact in the widthwise direction of the vehicular body at a side closer to attachment portion B2, then, as shown in FIG. 18B, battery pack 4 elastically and plastically deforms and thus displaces in a direction in which the physical impactive force acts. As battery pack 4 displaces, the shank of attachment bolt 76a in attachment portion A passes through slit S4 and thus reaches disengagement hole H. This causes a physical impact causing the head of attachment bolt 76a to come off disengagement hole H, and mount 55 and battery pack 3 at attachment portion A are disengaged (or released) from each other.

At attachment portion B, on the other hand, while battery pack 4 displaces rightward (in the figure, upward), the attachment portion B1 slit S1 does not allow the physical impact received from the side closer to attachment portion B2 to displace battery pack 4 rightward (in the figure, upward) and the attachment portions B2 and B3 slits S2 allow the physical impact received from the side closer to attachment portion B2 to displace battery pack 4 rightward (in the figure, upward), as has been described above, and upper case 401 and lower case 402 (compressively) deform in a vicinity of attachment portion B2 and attachment portion B3 to allow battery pack 4 to (compressively) displace rightward (in the figure, upward).

Thus, similarly as described in the third embodiment, battery pack 4 deforms while pivoting around bolt 72a of attachment portion B1 disallowing battery pack 4 to displace rightward (in the figure, upward) and thus absorbs and disperses physical impact, and in the present embodiment, upper case 401 and lower case 402 related to rail passing portion 404 located between battery modules BMs (compressively) deform to be sandwiched between battery modules BMs, and thus absorb physical impact.

This can reduce in comparison with the third embodiment the displaceability of battery pack 4 pivoting around bolt 72a of attachment portion B1 opposite to attachment portion B2 receiving physical impact when the vehicular body or battery pack 4 receives the physical impact at attachment portion B2, and it also allows sufficient absorption and dispersion of energy with respect to the physical impact. This can prevent battery pack 4 from excessively deforming, and also prevent battery pack 4 from colliding against other members, components or the vehicular body when battery pack 4 deforms.

The third and fourth embodiments have been described with an electricity storage pack provided with attachment portions A, B by way of example. Alternatively, for example, attachment portions A, B may be provided to mount 55a (55b) and mount 56a (56b). In that case, the electricity storage pack is configured of upper and lower cases that do not have a disengagement hole or a slit. This can reduce the cost for producing the cases and prevent an attachment portion from having reduced strength.

Furthermore in the third and fourth embodiments the support member and the electricity storage pack are bolted together. Alternatively, for example, they may be fitted or engaged together by a recess and a projection, a protrusion, a hook, or the like, and thus secured together.

The present invention can thus provide a structure mounting an electricity storage pack on a vehicle that can reduce or prevent damage to the electricity storage pack when the vehicular body or the electricity storage pack receives physical impact.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is advantageously applicable to electricity storage packs mounted on automobiles.

The invention claimed is:

1. A structure mounting an electricity storage pack on a vehicle, said electricity storage pack being secured to a support member by an attachment portion provided at each of one and the other ends of said electricity storage pack accommodating electricity storage equipment therein, wherein:
   one said attachment portion comprises an attachment hole; at least one disengagement portion for disengaging said support member and said electricity storage pack secured together at said one attachment portion; and a slit portion between said attachment hole and each of the at least one disengagement portion; and
   the other said attachment portion includes a first attachment portion and a second attachment portion distant from each other; wherein each of the first and second attachment portion comprises an attachment hole and at least one slit portion adjacent to said attachment hole;
   thereby allowing the electricity storage pack to easily deform and disengage from said support member at said one attachment portion in case of physical impact.

2. The structure mounting an electricity storage pack on a vehicle according to claim 1, wherein said first attachment portion includes a slit portion allowing said electricity storage pack to move toward said second attachment portion when physical impact is received.

3. The structure mounting an electricity storage pack on a vehicle according to claim 1, wherein said second attachment portion includes a slit portion allowing said electricity storage pack to move toward said first attachment portion when physical impact is received.

4. The structure mounting an electricity storage pack on a vehicle according to claim 1, wherein said electricity storage pack is secured to said support member by said one and other attachment portions with an attachment bolt, and said disengagement portion has a disengagement hole larger than a head of said attachment bolt.

5. The structure mounting an electricity storage pack on a vehicle according to claim 4, wherein said one attachment portion has a slit portion allowing said electricity storage pack to move toward one of said first attachment portion and said second attachment portion when physical impact is received, and said slit portion has an end having said disengagement portion.

6. The structure mounting an electricity storage pack on a vehicle according to claim 5, wherein said slit portion of said first and second attachment portions of said other attachment portion is larger in length than said slit portion of said one attachment portion.

7. The structure mounting an electricity storage pack on a vehicle according to claim 2, wherein said slit portion has a lengthwise direction substantially parallel to a direction in which one of a vehicular body and said electricity storage pack receives physical impact, wherein the direction is either approximately parallel or approximately perpendicular to the vehicular body's widthwise direction.

8. The structure mounting an electricity storage pack on a vehicle according to claim 2, wherein said first and second attachment portions have a slit portion having a lengthwise direction oblique with respect to a direction in which one of a vehicular body and said electricity storage pack receives physical impact, wherein the direction is approximately parallel or approximately perpendicular to the vehicular body's widthwise direction.

9. A structure mounting an electricity storage pack on a vehicle, said electricity storage pack being secured to a support member and accommodating electricity storage equipment therein, wherein:
   said support member includes an attachment portion for securing said electricity storage pack at one and the other ends to said support member;
   one said attachment aportion comprises an attachment hole; at least one disengagement portion for disengaging said support member and said electricity storage pack secured together at said one attachment portion, and a slit portion between said attachment hole and each of the at least one disengagement portion; and
   the other said attachment portion includes a first attachment portion and a second attachment portion distant from each other; wherein each of the first and second attachment portion comprises an attachment hole and at least one slit portion adjacent to said attachment hole;
   thereby allowing said support member to easily deform and disengage from said electricity storage pack at said one attachment portion in case of physical impact.

* * * * *